US007678299B2

United States Patent
Yamaguchi et al.

(10) Patent No.: US 7,678,299 B2
(45) Date of Patent: Mar. 16, 2010

(54) STOCK SOLUTION FOR PRODUCTION OF NONLINEAR-OPTICAL MATERIALS, NONLINEAR-OPTICAL MATERIAL, AND NONLINEAR-OPTICAL DEVICE

(75) Inventors: Yasuhiro Yamaguchi, Minamiashigara (JP); Tomozumi Uesaka, Minamiashigara (JP); Hokuto Takada, Minamiashigara (JP); Yasunari Nishikata, Minamiashigara (JP)

(73) Assignee: Fuji Xerox Co., Ltd., Tokyo (JP)

( * ) Notice: Subject to any disclaimer, the term of this patent is extended or adjusted under 35 U.S.C. 154(b) by 1654 days.

(21) Appl. No.: 10/866,689

(22) Filed: Jun. 15, 2004

(65) Prior Publication Data
US 2005/0139813 A1    Jun. 30, 2005

(30) Foreign Application Priority Data
Dec. 25, 2003   (JP)   ............................. 2003-429569

(51) Int. Cl.
*F21V 9/00* (2006.01)
*C07D 307/02* (2006.01)
*G03C 1/00* (2006.01)

(52) U.S. Cl. ..................... 252/582; 549/474; 549/492; 549/497; 549/502; 549/504

(58) Field of Classification Search .................... None
See application file for complete search history.

(56) References Cited

U.S. PATENT DOCUMENTS 5,064,265 A * 11/1991 Khanarian et al. .......... 385/130
2002/0160282 A1 * 10/2002 Huang et al. ................... 430/7
2003/0183811 A1 * 10/2003 Uesaka et al. ............... 252/582

FOREIGN PATENT DOCUMENTS

JP    A-5-34743    2/1993
JP    A 06-202177  7/1994

OTHER PUBLICATIONS

"Chemistry of Materials" 2001, vol. 13, pp. 3043-3050.
Moylan et al., "(Dicyanomethylene)pyran Derivatives with $C_{2v}$ Symmetry: An Unusual Class of Nonlinear Optical Chromophores", J. Am. Chem. Soc., vol. 118, pp. 12950-12955, 1996.
Oct. 6, 2009 Japanese Office Action issued in Japanese Application No. 2003-429569 with English translation.

* cited by examiner

*Primary Examiner*—Melvin C Mayes
*Assistant Examiner*—Sarah Van Oudenaren
(74) *Attorney, Agent, or Firm*—Oliff & Berridge, PLC

(57) ABSTRACT

The present invention provides stock solutions for production of nonlinear-optical materials using a wet coating method. In particular, the invention provides a stock solution containing a nonlinear-optically active organic compound, which is a push-pull π-conjugated compound having a particular chemical structure, having one or more cross-linkable functional groups. In addition, the invention provides a stock solution comprising a nonlinear-optically active organic compound having at least a certain chemical structure and a matrix-forming compound having one or more cross-linkable functional groups. Further, the invention provides a nonlinear-optical material and a nonlinear-optical device, both prepared by using the stock solutions.

18 Claims, 1 Drawing Sheet

STOCK SOLUTION FOR PRODUCTION OF NONLINEAR-OPTICAL MATERIALS, NONLINEAR-OPTICAL MATERIAL, AND NONLINEAR-OPTICAL DEVICE

CROSS-REFERENCE TO RELATED APPLICATIONS

This application claims benefit of and priority to Japanese Patent Application No. 2003-429569, which is incorporated herein by reference in its entirety for all purposes.

BACKGROUND OF THE INVENTION

1. Field of the Invention

The present invention relates to a nonlinear-optical material and a nonlinear-optical device applicable to fields such as optical communication, optical wiring, optical information processing, sensors, and image processing, and a stock solution for producing the same.

More specifically, the invention relates to a nonlinear-optical device such as an optical switching device, optical modulating device, wavelength-converting device, or phase-shifting devices utilizing second-order nonlinear-optical effects, or a memory device or image-processing device utilizing photorefractive effects; and a nonlinear-optical material applicable to these applications; and a stock solution for manufacturing the same.

2. Description of the Related Art

Most of the functional devices important in optical fields are realized by the use of nonlinear-optical materials, in particular, second-order nonlinear-optical materials. Such devices include wavelength-converting devices, optical modulating devices, and optical switching devices, and these are important in optical fields such as optical communication, optical wiring, optical information processing, sensors, and image processing. Inorganic nonlinear-optical materials, such as lithium niobate, and potassium dihydrogen phosphate, have already been commercialized and are widely used as second-order nonlinear-optical materials, but recently, organic nonlinear-optical materials have been attracting attention due to advantages in their improved nonlinear-optical characteristics, lower material and production cost, higher productivity and the like. Extensive research and development is currently directed to commercialization of these materials in order to replace conventional inorganic materials.

An essential requirement in order to achieve the second-order nonlinear-optical effect is that there be, in principle, no center of symmetry in the system. Second-order nonlinear-optical materials are roughly classified into two systems, the first being a system where an organic compound exhibiting nonlinear-optical activity is crystallized in a crystal structure having no symmetry center (hereinafter, referred to as a "crystalline system"). The second system involves an organic compound exhibiting nonlinear-optical activity (i.e., a nonlinear-optically active organic compound) dispersed in a polymer binder and the symmetry center of the system is eliminated by orientation using a certain means (hereinafter, referred to as a "dispersion system").

Although organic nonlinear-optical materials of the crystalline system are known to exhibit extremely superior nonlinear-optical characteristics, it is almost impossible to control the crystal structure artificially, and thus it is very rare that crystal structures without any symmetry centers are obtained. Even if obtained, it is difficult to produce the large organic crystals required for producing optical devices. In addition, these optical materials often cause various problems, as the organic crystals are very fragile or brittle and are often damaged during production of the devices.

In contrast, organic nonlinear-optical materials of the dispersion system are regarded as more promising, because they have greater potential for commercialization. This is due to the fact that they are provided with favorable characteristics such as good coatability and mechanical strength, attributes that are useful for producing devices with polymer binders.

Dispersion-type organic nonlinear-optical materials must be optically homogeneous and transparent, and thus, the nonlinear-optically active organic compound contained therein should be dispersed in the polymer binder uniformly without aggregation. In addition, as described above, it is necessary to orient the nonlinear-optically active organic compound by using a certain means in order to cause the anisotropy required for the second-order nonlinear-optical effect. It is also necessary order to obtain effective use of the functional devices and to preserve the oriented state consistently in hot or humid environments during production, operation, and storage of the resulting devices.

Accordingly, the nonlinear-optically active organic compounds to be used in dispersion-type organic nonlinear-optical materials must not only have superior nonlinear-optical characteristics, but also a lower tendency toward aggregation and higher compatibility with the polymer binder. The dispersion-type organic nonlinear-optical materials are generally converted to various devices in the form of thin films, and wet coating methods are favorably used for forming the thin films. For this reason, nonlinear-optically active organic compounds used in dispersion-type organic nonlinear-optical materials should be highly soluble in the stock solution solvents. It is also necessary for the polymer binders to have, in addition to qualities such as superior coatability and mechanical strength, a high glass-transition temperature in order to consistently maintain the orientation of the nonlinear-optically active organic compound contained therein.

It is necessary to orient the nonlinear-optically active organic compound as described above for generating the second-order nonlinear-optical activity in dispersion-type organic nonlinear-optical materials, and the electric field-poling method is commonly used as the orientation method. The electric field-poling method is an orientation method of applying an electric field to a nonlinear-optical material and orienting the nonlinear-optically active compound therein in the direction of the applied electric field by the Coulomb force between the dipole moment of the nonlinear-optically active compound and the applied electric field. The orientation of the nonlinear-optically active compound is generally assisted by the activation of molecular motion by heating to a temperature close to the glass-transition temperature during application of the electric field.

It is known that so-called push-pull π-conjugated compounds having an electron-donating group at one end of the π-conjugated chain and an electron-withdrawing group at the other end are effective nonlinear-optically active organic compounds. For example, Disperse Red 1 (generally, abbreviated to DR1) having an N-ethyl-N-(2-hydroxyethyl)amino group as the electron-donating group at the 4 position and a nitro group as the electron-withdrawing group at the 4' position of the azo benzene structure (π-conjugated chain) is widely known as a typical nonlinear-optically active organic compound. However, given that DR1 does not in essence possess superior nonlinear-optical characteristics and has both a lower compatibility with ordinary polymer binders and a higher tendency to sublimate, DR1 is problematic in that it disappears with the application of heat in the drying and electric-field poling processes, and dialkylamino groups tend to oxidize and deteriorate.

Various nonlinear-optically active organic compounds have been developed hitherto to solve these problems, but compounds satisfying all of the required characteristics at the same time have yet to discovered. In particular, it is quite difficult to provide a compound superior having both nonlinear-optical characteristics and higher binder compatibility. Namely, the nonlinear-optical characteristics of push-pull π-conjugated compounds are known to be improved by generally elongating the π-conjugated chain therein and strengthening the electron-withdrawing capacity of electron-withdrawing group and the electron-donating capacity of electron-donating group. Nonetheless, the improvement in nonlinear-optical characteristics is accompanied by an increase in aggregation between molecules, consequently leading to a decrease in the compatibility of the conjugated compounds with the polymer binder.

For example, it has been disclosed that a compound having the structure shown below exhibited extremely superior nonlinear-optical characteristics, however, it is very difficult to produce a film where the compound is uniformly dispersed in the polymer binder and crystal precipitation is suppressed due to its extremely high tendency to coagulate (see e.g., Chemistry of Materials, 2001, Vol. 13, pp. 3043 to 3050). It has been also disclosed therein that it is necessary to use a halogenated solvent having a low boiling point as the coating solvent, but the use of such a halogenated solvent is not favorable as it negatively affects air quality.

(JP-A) No. 6-202177). Use of these polymer binders having higher glass-transition temperatures is inevitably accompanied with an increase in the heating temperature required for electric-field poling, and this in turn causes oxidation and disappearance by sublimation of the nonlinear-optically active organic compounds such as DR1 during the electric-field poling process. The compatibility between these polymer binders having high glass-transition temperatures and a nonlinear-optically active organic compound such as DR 1 is not always high, and accordingly, addition of the nonlinear-optically active organic compound at a higher concentration for the purpose of improving the nonlinear-optical characteristics causes aggregation or crystallization of the compound. Further, addition of nonlinear-optically active organic compounds even at a lower concentration, still causes aggregation or crystallization by heating or the passage of time.

As a means for solving the problems of the dispersion-type organic nonlinear-optical materials described above, the introduction of a nonlinear-optically active organic compound to the main chain and/or side-chain of a polymer, i.e., conversion of the nonlinear-optically active organic compound to a polymeric compound, is being studied.

For example, a nonlinear-optically active polymeric compound having the following structure where the DR1 structure is bound to the side chain of PMMA has been developed.

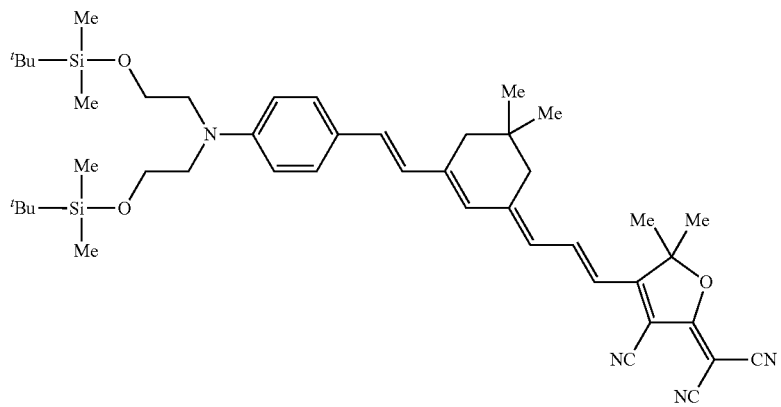

On the other hand, although polymethyl methacrylate (generally abbreviated to PMMA) has been most intensively studied as the polymer binder, the glass-transition temperature of PMMA is lower at about 100° C., and thus the orientation of a dispersion-type organic nonlinear-optical material in the PMMA polymer binder gradually slackens even at room temperature. Nonlinear-optical materials derived therefrom exhibit a marked decrease in nonlinear-optical characteristics over time. Thus, PMMA-based optical materials are not suitable for actual use in functional devices (e.g., Chemical Reviews, 1994, Vol. 94, No. 1, pp. 31 to 75).

In order to solve these problems, binder polymers for replacing PMMA have been intensively studied, leading to polymers having glass-transition temperatures that are higher than that of PMMA. Examples of reported binder polymers include polycarbonate, polyimide, polysulfone, and polycyclic olefin (see e.g., Japanese Patent Application Laid-Open

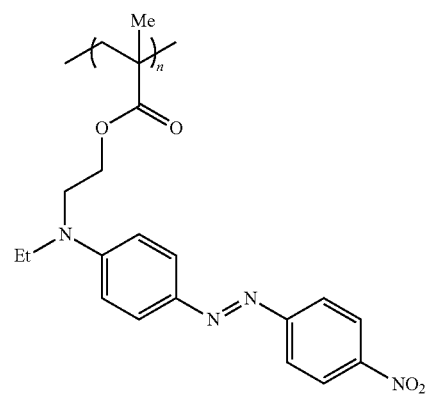

The glass-transition temperature of this nonlinear-optically active polymeric compound is about 165° C. and higher than the glass-transition temperature of PMMA (about 100° C.). In contrast to the fact that DR1 can be dispersed in PMMA only at a concentration of up to 30% by mass without crystal precipitation, the nonlinear-optically active polymeric compound, which contains the DR1 structure at a concentration equivalent to 82% by mass, provides a clear film without phase separation. Accordingly, the nonlinear-optically active polymeric compound exhibits higher nonlinear-optical characteristics and higher stability than the dispersion-system compounds where DR1 is dispersed in PMMA.

However, even if polymerization is possible, it is difficult to both polymerize the monomers having a bulky nonlinear-optically active structure and control the degree of polymerization. If the degree of polymerization is not raised sufficiently, the resulting polymers have significantly lower mechanical strength. In addition, insufficient control of the degree of polymerization causes a problem in that it is difficult to produce films having a certain consistent thickness due to fluctuation by production lot of the viscosity of coating solutions (stock solutions). As purification of polymers is generally difficult, residual impurities such as polymerization catalysts may also make it more difficult to apply an effective electric field during electric-field poling. Therefore, introduction of a nonlinear-optically active organic compound into the main chain and/or side-chain of a polymer is hardly the best method.

To solve the problems associated with the aforementioned dispersion-type organic nonlinear-optical materials, a method of preparing a cross-linkable nonlinear-optically active organic compound is being studied. A nonlinear-optically active organic compound such as DR1 is introduced to the cross-linkable functional group in the compound, and the cross-linkable nonlinear-optically active organic compound is coated and dried, after which electric-field poling and curing by cross-linking treatments are conducted simultaneously (hereinafter, referred to as a "curing by cross-linking system"). This method provides a favorable effect of stabilizing the oriented state significantly, as it fixes the oriented state induced by the electric-field poling by cross-linking. In addition, since the raw material, i.e., the cross-linkable nonlinear-optically active organic compound, is a low-molecular weight compound, the problems concerning the polymerization and purification of the aforementioned nonlinear-optically active polymeric compound are reduced.

However, conventional nonlinear-optically active organic compounds are highly aggregative, and thus even if cross-linking and curing of organic compounds having a cross-linkable functional group is conducted, such organic compounds tend to aggregate or crystallize in the drying step prior to curing by cross-linking and clear cured films cannot be obtained. These compounds are also problematic in that a cross-linking reaction causes gelation of the stock solution, or with pot life of the stock solution due to precipitation, leading to deterioration in optical quality and increase in the production cost of the resulting films.

SUMMARY OF THE INVENTION

The present invention is provided in view of the aforementioned problems associated with conventional art.

Namely, the invention relates to a cross-linkable organic nonlinear-optical material having a high potential of exhibiting an excellent stability, and provides a cross-linkable stock solution for production of nonlinear-optical materials relieved of the problems of aggregation and crystallization and having an excellent pot life. Further by making the most of the stock solution, the invention provides a nonlinear-optical material and a nonlinear-optical device having excellent nonlinear-optical characteristics and a superior stability at a lower cost.

As a result of intensive studies to solve the problems above concerning the nonlinear-optically active organic compounds and the methods of curing by cross-linking, the inventors have found that it is possible to solve the problems by using a particular cross-linkable nonlinear-optically active organic compound. Namely, a first aspect of the present invention is a stock solution for production of nonlinear-optical materials using a wet coating method, comprising a nonlinear-optically active organic compound satisfying either condition (i) or (ii):

(i) the nonlinear-optically active organic compound further comprising at least one cross-linkable functional group; and the nonlinear-optically active organic compound is a push-pull π-conjugated compound represented by Formula (1), or (ii) the stock solution further comprises a matrix-forming compound having at least one cross-linkable functional group; and the nonlinear-optically active organic compound is represented by Formula (2):

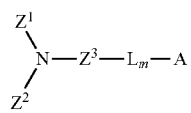

Formula (1)

wherein in Formula (1), $Z^1$ to $Z^3$ each are independently an aromatic group which may have substituents; L is a π-conjugated group which may have substituents; A is an electron-withdrawing group which may have substituents; and m is 0 or 1, wherein $Z^1$ to $Z^3$, L and A each may be linked with any other group to form a ring structure; and at least one of $Z^1$ to $Z^3$, L and A has one or more cross-linkable functional groups:

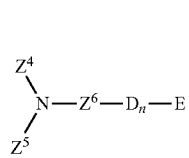

Formula (2)

wherein in Formula (2), $Z^4$ to $Z^6$ each are independently an aromatic group which may have substituents; D is a π-conjugated group which may have substituents; E is an electron-withdrawing group which may have substituents; n is 0 or 1; and $Z^4$ to $Z^6$, D, and E each may be linked with any other group to form a ring structure and may have one or more cross-linkable functional groups.

A second aspect of the present invention is a nonlinear-optical material prepared using a wet coating method and the stock solution satisfying the above-described condition (i) or (ii).

Further, a third aspect of the present invention is nonlinear-optical device prepared using a wet coating method and the stock solution satisfying the above-described condition (i) or (ii).

BRIEF DESERIPTION OF THE DRAWINGS

Preferable embodiments of the present invention will be described in detail based on the following figures.

DETAILED DESCRIPTION OF THE INVENTION

Figure 1:
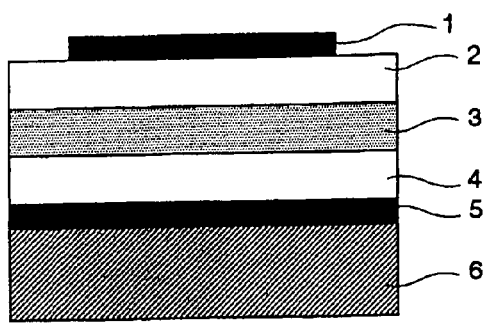
FIG. 1 is a schematic cross-sectional view showing a configuration of an embodiment of the nonlinear-optical device according to the invention, a waveguide-type electro-optical device.
Figure 2:
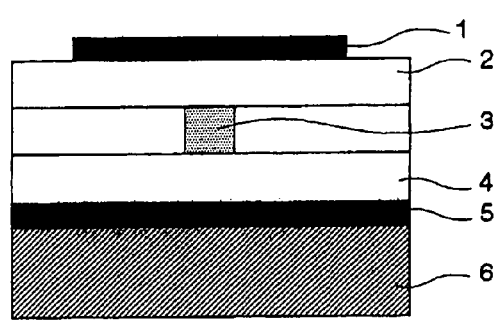
FIG. 2 is a schematic cross-sectional view showing a configuration of an embodiment of the nonlinear-optical device according to the invention, a waveguide-type electro-optical device (having a channel waveguide structure).
Figure 3:
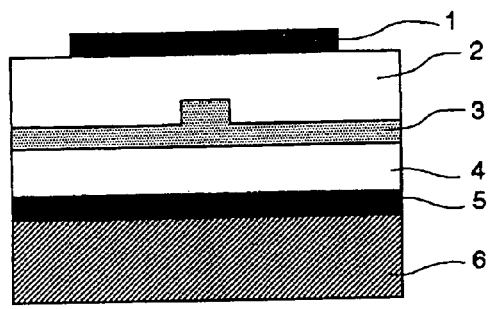
FIG. 3 is a schematic cross-sectional view showing a configuration of an embodiment of the nonlinear-optical device according to the invention, a waveguide-type electro-optical device (having a ridge waveguide structure).

The present invention provides a stock solution for production of nonlinear-optical materials, which is superior in the processability in forming nonlinear-optical materials by wet coating method and allows production of nonlinear-optical materials and nonlinear-optical devices superior in nonlinear-optical characteristics.

The invention also provides conveniently a nonlinear-optical material superior both in nonlinear-optical characteristics and in thermal stability due to curing by cross-linking, and a nonlinear-optical device higher in stability and longer in operating time at a lower cost by using the same.

Hereinafter, the invention will be described in detail with reference to specific embodiments.

Stock Solution

The stock solutions according to the invention are classified into two groups, a first stock solution and a second stock solution.

The first stock solution according to the invention is a stock solution for production of nonlinear-optical materials by wet coating method, containing at least a nonlinear-optically active organic compound having one or more cross-linkable functional groups, the nonlinear-optically active organic compound further being a push-pull π-conjugated compound represented by the following Formula (1).

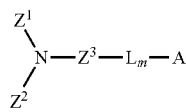

Formula (1)

In the formula above, $Z^1$ to $Z^3$ each are independently an aromatic group which may have substituents; L is a π-conjugated group which may have substituents; A is an electron-withdrawing group which may have substituents; and m is 0 or 1, wherein $Z^1$ to $Z^3$, L and A each may be linked with any other group to form a ring structure; and at least one of $Z^1$ to $Z^3$, L and A has one or more cross-linkable functional groups.

As will be described below, the compound having the structure represented by the Formula (1) has a great nonlinear-optical effect. According to the invention, a stock solution having an excellent pot life, i.e., free from gelation or precipitation, can be obtained with the compound, and a nonlinear-optical material excellent in nonlinear-optical characteristics can be produced with this stock solution.

The first stock solution according to the invention contains at least a nonlinear-optically active organic compound having one or more cross-linkable functional groups, and the cross-linkable functional group may be contained by at least one group of $Z^1$ to $Z^3$, L, and A in the compound represented by Formula (1) and the number of cross-linkable functional groups is not particularly limited if it is at least one.

$Z^1$ to $Z^3$ in the Formula (1) each are independently an aromatic group which may have substituents, and a phenyl or phenylene group which may have substituents is preferable from the viewpoints of productivity and chemical stability. Having the triarylamine structure, the compound is more resistant to oxidation, thermal degradation, and photodegradation. Further, the triarylamine structure suppresses intermolecular association, improving the dispersion of the nonlinear-optically active organic compound in the cross-link film and suppressing the aggregation and crystallization thereof after coating. L is a 7π-conjugated group which may have substituents. A is an electron-withdrawing group which may have substituents and preferably from the viewpoints of chemical stability, nonlinear-optical characteristics, and the like, a π-conjugated electron-withdrawing group, which contains a ring structure and may have a substituent.

In the invention, $Z^1$ to $Z^3$, L and A each may be linked with any other group to form a ring structure thereof. The bulky and rigid ring structure thus formed inhibits association of molecules and increases oxidation resistance.

In addition, the Formula (1) preferably includes a π-conjugation system that spans both ends of the $Z^3$-$L_m$ structure formed from five or more consecutive unsaturated bonds. As described above, it is favorable to elongate the π-conjugated chain between the electron-withdrawing and electron-donating groups in the push-pull π-conjugation compounds from the viewpoint of improving the nonlinear-optical characteristics, and thus π-conjugation systems having 5 or more consecutive conjugated bonds provide the compound according to the invention represented by Formula (1) with particularly favorable nonlinear-optical characteristics.

The π-conjugation system more preferably has 7 or more conjugated bonds, and the upper limit of the number of conjugation is about 15, from the viewpoint of ensuring the oxidation resistance and aggregation resistance. In the invention, the "consecutive π-conjugation system" means a system wherein unsaturated bonds are connected one by one and thus conjugated.

The cross-linkable functional group above may be any one of the groups including groups cross-linkable as it is, groups cross-linkable only in the presence of another group, groups cross-linkable in the presence of a cross-linking aid, and the like. The cross-linking bond formed may be an ionic bond, hydrogen bond, coordination bond, or covalent bond, but a covalent bond is preferable from the viewpoint of stability.

Typical examples of the cross-linkable functional groups include: a hydroxy group, an amino group, a carboxyl group, an epoxy group, an isocyanate group, substituted or unsubstituted benzocylcobutene groups, substituted or unsubstituted vinyl groups, substituted or unsubstituted hydroxysilyl groups, substituted or unsubstituted hydrolysable silyl groups, and the like. Among them, substituted or unsubstituted hydrolysable silyl groups are particularly preferable, as they provide cross-linked and cured films superior in optical quality, mechanical strength, solvent resistance, chemical stability, and the like.

The hydrolysable silyl group is a silyl group of which part or all of the hydrogen atoms are replaced with hydrolysable groups typically by an alkoxy group. When hydrolysable silyl groups are used as the cross-linkable functional groups, all the cross-linkable functional groups need not be but are preferably hydrolysable silyl groups.

Details about nonlinear-optically active organic compounds having the hydrolysable silyl groups will be described below.

Because these cross-linkable functional groups react gradually even at room temperature, the pot life of the stock solution containing the groups for production of nonlinear-optical materials is generally short, but may be extended by storing them under a dry low-temperature condition in a dark place.

Typical examples of the nonlinear-optically active organic compound having one or more cross-linkable functional groups, represented by Formula (1), are as follows.

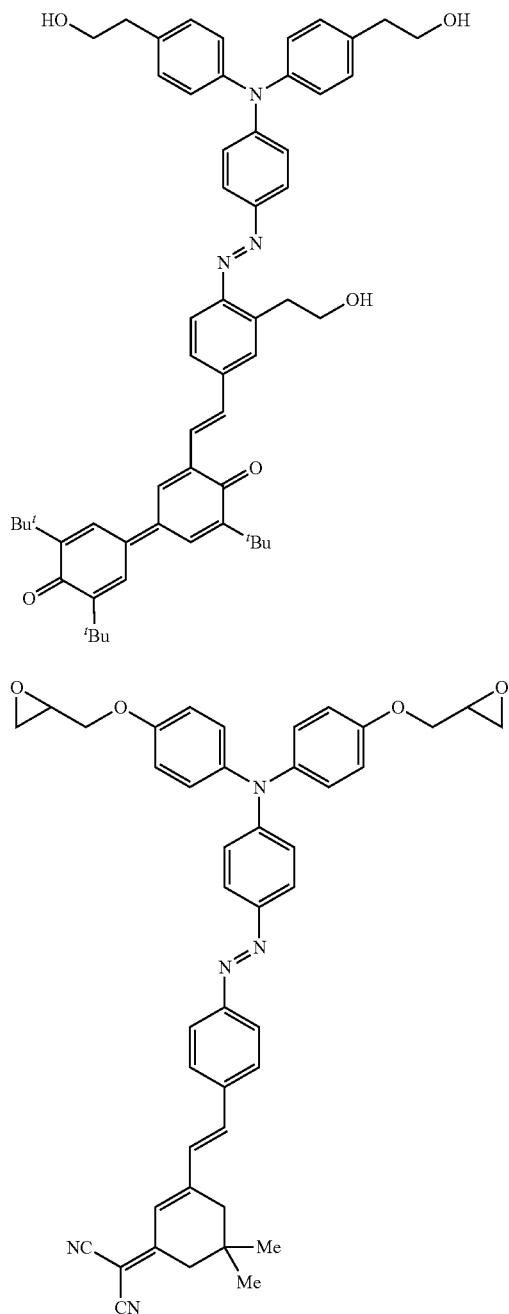

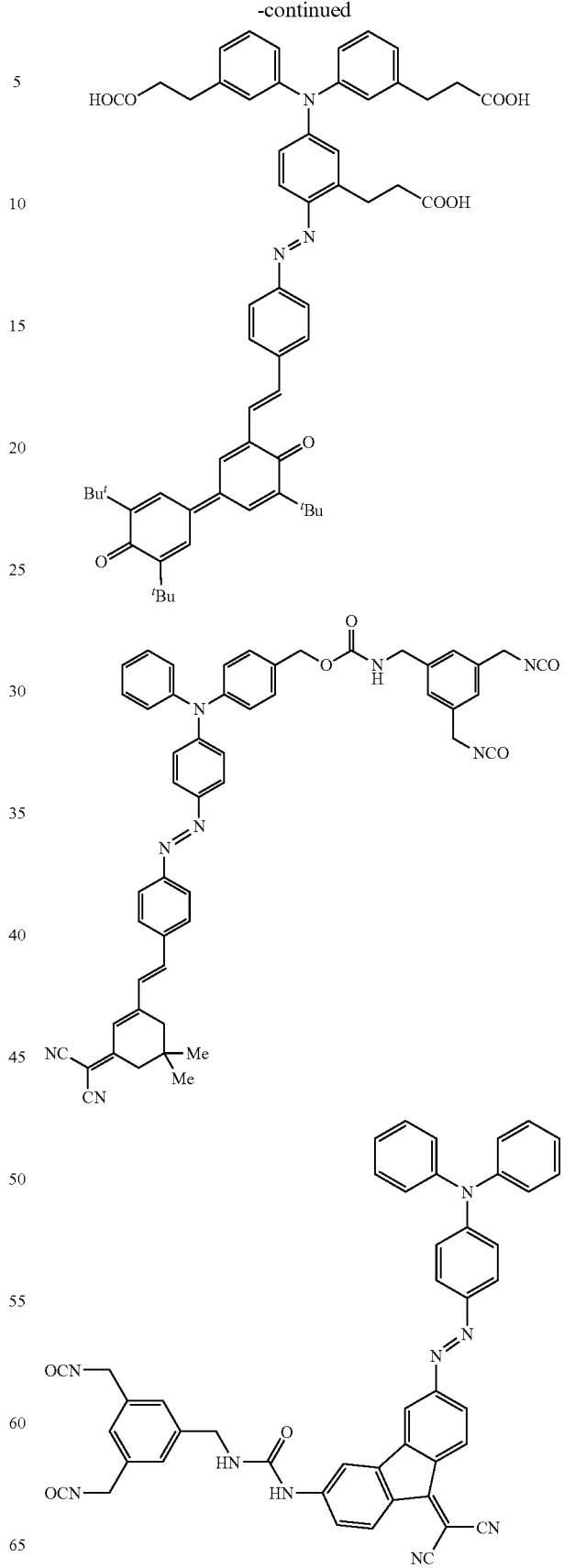

-continued

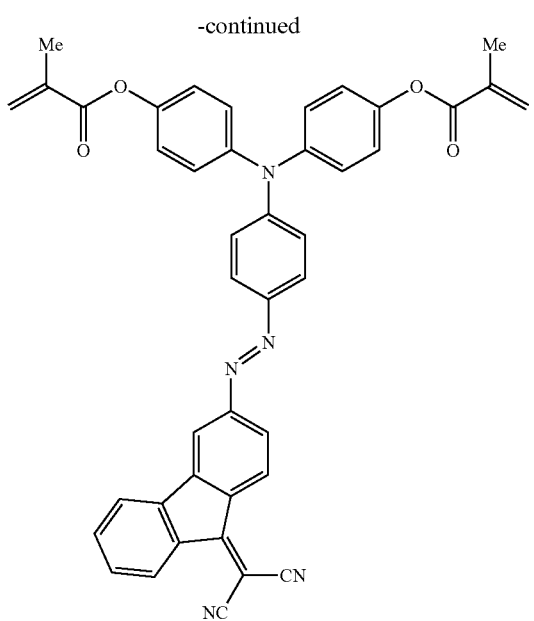

The present inventors have earlier found the method that could drastically improve the pot life at room temperature and atmospheric pressure of a stock solution for production of nonlinear-optical materials containing a cross-linkable nonlinear-optically active organic compound having a particularly preferred cross-linkable functional group, i.e., a hydrolysable silyl group (Japanese Patent Application No. 2003-77616).

To conventional stock solutions for production of nonlinear-optical materials containing a cross-linkable nonlinear-optically active organic compound having one or more hydrolysable silyl groups, an acid catalyst such as hydrochloric and sulfuric acids or a base catalyst such as pyridine or triethyl amine is added for acceleration of hydrolysis and polycondensation of the hydrolysable silyl group, but the practice brought the problems in pot life, such as the gelation of solution in a shorter period of time and the precipitation of solid matters therein, as hydrolysis and polycondensation reactions take place at the same time in the stock solutions which are added with such a homogeneous catalyst.

Although it is possible to produce clear films by coating the solution before the gelation and precipitation occur, such a procedure is lower in operational efficiency, inevitably leading to increase in production cost. In addition, polycondensation of the ingredients therein, which proceeds gradually even before the gelation and precipitation occur, raised the problems that it is more difficult to obtain nonlinear-optical materials having a particular film thickness due to variation in solution viscosity and the optical quality of the films obtained deteriorates due to generation of minute hardened particles in the solution. Further, the acid or base catalyst remains in the film even during electric-field poling and causes a problem of improper application of poling electric field to the film due to its ionic conductivity.

With respect to these conventional stock solutions for production of nonlinear-optical materials containing a cross-linkable nonlinear-optically active organic compound having one or more hydrolysable silyl groups, the method found by the inventors drastically improves the pot life of the stock solution for production of nonlinear-optical materials containing a cross-linkable nonlinear-optically active organic compound having one or more hydrolysable silyl groups without sacrificing the curing by cross-linking performance.

Namely, a stock solution for production of nonlinear-optical materials containing a cross-linkable nonlinear-optically active organic compound having a hydrolyzed silyl group is produced, by using a solid catalyst as the hydrolysis catalyst in a solution containing a nonlinear-optically active organic compound having one or more hydrolysable silyl groups as the cross-linkable functional group, bringing the solution into contact with the solid catalyst, and thus hydrolyzing the hydrolysable silyl group (hydrolysis treatment); and then removing the solid catalyst from the solution (catalyst-separation treatment).

In addition to the hydrolysis and separation treatments above, any other optional treatments of the stock solution according to the invention may be added before, during and/or after the two steps. Details about the hydrolysis and separation treatments will be described in detail below.

This stock solution is stable as it contains no catalyst and exhibits a drastically longer pot life than conventional homogeneous catalyst systems. As the hydrolysable silyl group is already hydrolyzed to a polycondensable hydroxysilyl group, a dehydration condensation reaction easily progresses when heated at a temperature higher than the boiling temperature of water (100° C.), leading to curing by cross-linking. Accordingly, the method above allows both an excellent pot life at room temperature and high curing by cross-linking performance during electric-field poling (performed commonly at a temperature of not less than 100° C.).

In the invention, use of a compound represented by the Formula (1) as the nonlinear-optically active organic compound according to the method above allows production of stock solutions stable at higher concentration and of nonlinear-optical materials having a desirable film thickness consistently without the problem of aggregation or crystallization even when coated with this stock solution. The nonlinear-optically active organic compound described above has excellent nonlinear-optical characteristics, and thus elements containing the compound exhibit more excellent characteristics than ever in operating voltage, size and the like and expand the possible application areas as will be described below.

Stock solutions excellent both in pot life and curing by cross-linking performance may be obtained, by adding a metal chelate catalyst as the hydrolysis catalyst to a solution containing the nonlinear-optically active organic compound having one or more hydrolysable silyl groups as the cross-linkable functional group and hydrolyzing the hydrolysable silyl group (hydrolysis treatment); adding an anticatalyst that inhibits the catalytic activity of the metal chelate catalyst to the solution (termination treatment); and thus producing a stock solution for production of nonlinear-optical materials containing a cross-linkable nonlinear-optically active organic compound having a hydrolyzed silyl group.

Metal chelate compounds described in a non-patent document (Nippon Kagaku Kaishi, 1998, No. 9, pp. 571 to 579), and aluminum alkoxides, titanium alkoxides, zirconium alkoxides, or the like having at least one chelating agents including acetylacetone, quinolinol, and the like may be used effectively as the metal chelate catalysts.

Multidentate ligands having a greater chelating potential are effective as the anticatalyst, and typical examples thereof include acetylacetone, quinolinol, and the like.

During the hydrolysis using the solid catalyst or metal chelate catalyst, polycondensation reaction may also progress in parallel with the hydrolysis reaction. However, the polycondensation reaction may be stopped practically anytime by removing a solid catalyst when the solid catalyst is used or by adding an anticatalyst when a metal chelate catalyst is used, which ensures an elongated pot life of the solution.

The second stock solution according to the invention is a stock solution for production of nonlinear-optical materials by wet coating method, containing at least one nonlinear-optically active organic compound represented by the following Formula (2) and a matrix-forming compound having one or more cross-linkable functional groups.

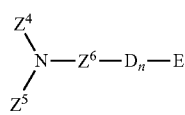

Formula (2)

In the formula above, $Z^4$ to $Z^6$ each are independently an aromatic group which may have substituents; D is a π-conjugated group which may have substituents; E is an electron-withdrawing group which may have substituents; n is 0 or 1; and $Z^4$ to $Z^6$, D, and E each may be linked with any other group to form a ring structure and may have one or more cross-linkable functional groups.

From the viewpoints of chemical stability, nonlinear-optical characteristics, and the like, E is preferably a π-conjugated electron-withdrawing group, which contains a ring structure and may have substituents.

In addition, the Formula (2) preferably includes a π-conjugation system that spans both ends of the $Z^6$-$D_n$ structure formed from five or more consecutive unsaturated bonds. The π-conjugation system more preferably has 7 or more conjugated bonds, and the upper limit of the number of conjugation is about 15, from the viewpoint of ensuring the oxidation resistance and aggregation resistance.

The second stock solution above contains, in addition to a nonlinear-optically active organic compound having a cross-linkable functional group, a matrix-forming compound having one or more cross-linkable functional groups. In a similar manner to the nonlinear-optically active organic compound having a cross-linkable functional group for the first stock solution, this matrix-forming compound also contributes to film forming by three-dimensional cross-linking of the cross-linkable functional groups, but the matrix-forming compound, which does not have a nonlinear-optically active structure such as that in the nonlinear-optically active organic compound, provides the resulting films cross-linked together with the nonlinear-optically active organic compound with favorable characteristics such as flexibility and the like due to the structure of the matrix-forming compound.

The cross-linkable functional groups in the matrix-forming compounds are not particularly limited, and include groups similar to those described for the cross-linkable functional groups for the first stock solution. Among them, substituted or unsubstituted hydrolysable silyl groups are particularly preferable as they provides cross-linked and cured films excellent in optical quality, mechanical strength, solvent resistance, chemical stability, and the like. On the other hand, the preferred structure, preferred cross-linkable functional group, and the like of the nonlinear-optically active organic compound are similar to those described for the cross-linkable functional groups for the first stock solution, except that the nonlinear-optically active organic compound may not have a cross-linkable functional group.

Details about the matrix-forming compounds will be described below.

Because the matrix-forming compound in the second stock solution indispensably contains a cross-linkable functional group as described above, the nonlinear-optically active organic compound need not have a cross-linkable functional group. In such a case, the nonlinear-optically active organic compound is present as dispersed in the three-dimensionally cross-linked matrix-forming compound.

If hydrolysable silyl groups are used as the cross-linkable functional groups of the matrix-forming compound and the nonlinear-optically active organic compound as in the case of the first stock solution, all cross-linkable functional groups need not be but are preferably the hydrolysable silyl groups.

In the second stock solution, matrix-forming compounds having two or more hydrolysable silyl group are preferably used as the matrix-forming compounds having one or more cross-linkable functional groups, and nonlinear-optically active organic compounds having one or more hydrolysable silyl groups are particularly preferably used for increasing the cross-linking density of the final cross-linked films.

The mixing ratio of the nonlinear-optically active organic compound represented by the Formula (2) to the matrix-forming compound (nonlinear-optically active organic compound/matrix-forming compound) is preferably in the range of 1/99 to 95/5, and more preferably in the range of 20/80 to 80/20 by weight.

In the similar manner to the first stock solution, with respect to the second stock solution according to the invention, the solution containing a nonlinear-optically active organic compound and a matrix-forming compound is particularly preferably subjected at least to the hydrolysis treatment wherein the hydrolysable silyl group is hydrolyzed by bringing it into contact with a solid catalyst and the catalyst-separation treatment wherein the solid catalyst is removed from the solution after the hydrolysis treatment; or, at least to the hydrolysis treatment wherein the hydrolysable silyl group is hydrolyzed by adding a metal chelate catalyst and the termination treatment wherein the catalytic activity of the metal chelate catalyst in the stock solution is inhibited by addition of an anticatalyst after the hydrolysis treatment; for the purpose of improving the pot life, curing by cross-linking performance, and the like of the stock solution.

Hereinafter, the nonlinear-optically active organic compound having one or more hydrolysable silyl groups, the hydrolysis and catalyst separation steps using a solid catalyst, other components contained in the stock solution, solvents used for the stock solution, and the matrix-forming compound having hydrolysable silyl groups used in the second stock solution, all common to the first and second stock solutions according to the invention, will be described in that order. Nonlinear-optically active organic compound having one or more hydrolysable silyl groups.

The nonlinear-optically active organic compound having one or more hydrolysable silyl groups favorably used in the invention is a compound represented by the following Formula (3):

Formula (3)

In Formula (3), j is an integer of 1 or more; G is a group wherein a binding bond for binding to Y is introduced to a site in the nonlinear-optically active organic compound represented by the Formula (1) or (2) [if a cross-linkable functional group is contained in the nonlinear-optically active organic compound represented by the Formula (2)].

The binding bond is not particularly limited if it can form a bond between G and Y, and specific examples thereof include hydrocarbon groups represented by —$C_nH_{2n}$—, —$C_{(n+1)}H_{2n}$—, and —$C_{(n+1)}N_{(2n-2)}$— (wherein, n is an integer of 1 to 15); —CO—, —COO—, —NHCO—, —S—, —O—, —N=CH—, —N=N—, a phenylene group, and the derivatives thereof having substituents; and the combinations thereof; and the like.

The binding bond may be introduced to any site of $Z^1$ to $Z^3$, L, or A in Formula (1), or of $Z^4$ to $Z^6$, D, or E in Formula (2), but the binding site and the structure of the binding bond are properly selected so that at least the nonlinear-optical characteristics are not damaged.

Y in the Formula (3) is represented by the following Formula (4):

$$-SiR_nQ_{(3-n)} \quad \text{Formula (4)}$$

In Formula (4), R represents a hydrogen atom, a substituted or unsubstituted alkyl group, or a substituted or unsubstituted aryl group. The alkyl group is not particularly limited, but preferably a group having 1 to 20 carbons, and more preferably a group having 1 to 15 carbons. The aryl group is preferably a group having three or less aromatic rings.

Q represents a hydrolysable group, and n an integer of 0 to 2.

Therefore, Y is a hydrolysable silyl group, which is converted to a hydroxysilyl group (silanol group) by hydrolysis of the hydrolysable group Q and forms a cross-linked matrix by dehydration condensation with other hydroxysilyl groups. Q is an alkoxy, arylhydroxy, dialkylamino or alkylcarboxy group, a halogen atom, or the like, but preferably an alkoxy group. If the number of Y is increased, the cross-linking density, mechanical strength and stability of the resulting nonlinear-optical materials are improved, but on the contrary, the orientation by poling is hindered. Accordingly, j is preferably an integer of 1 to 3.

The number of the hydrolysable group Q is 1 to 3, but if the number of hydrolysable group Q is 3, the polycondensation reaction may proceed in the stock solution rapidly, reducing the pot life thereof, as the reactivity of the hydrolysable silyl group are significantly high.

In such a case, reduction of the number of hydrolysable group Q in the hydrolysable silyl group to 1 or 2 and introduction of the structure R replacing the hydrolysable silyl group can reduce the reactivity and extend the pot life of the stock solution.

In addition, if the hydrolysable group Q is an alkoxy group, the reactivity decreases in the order of bulkiness, i.e., methoxy group >ethoxy group >propoxy group, and if, for example, a methoxy group causes the problem in pot life, introduction of an isopropoxy group replacing the methoxy group can elongate the pot life of the stock solution.

Typical examples of the nonlinear-optically active organic compounds having one or more hydrolysable silyl groups represented by Formula (3) include the following compounds. In these compound's, "Me" represents a methyl group, "Et" an ethyl group, and "Pro" an isopropyl group.

When used together with a matrix-forming compound having one or more cross-linkable functional groups, the nonlinear-optically active organic compound represented by Formula (2) needs not have a cross-linkable functional group, but preferably have one or more cross-linkable functional groups, from the viewpoints of stability, optical quality, and the like.

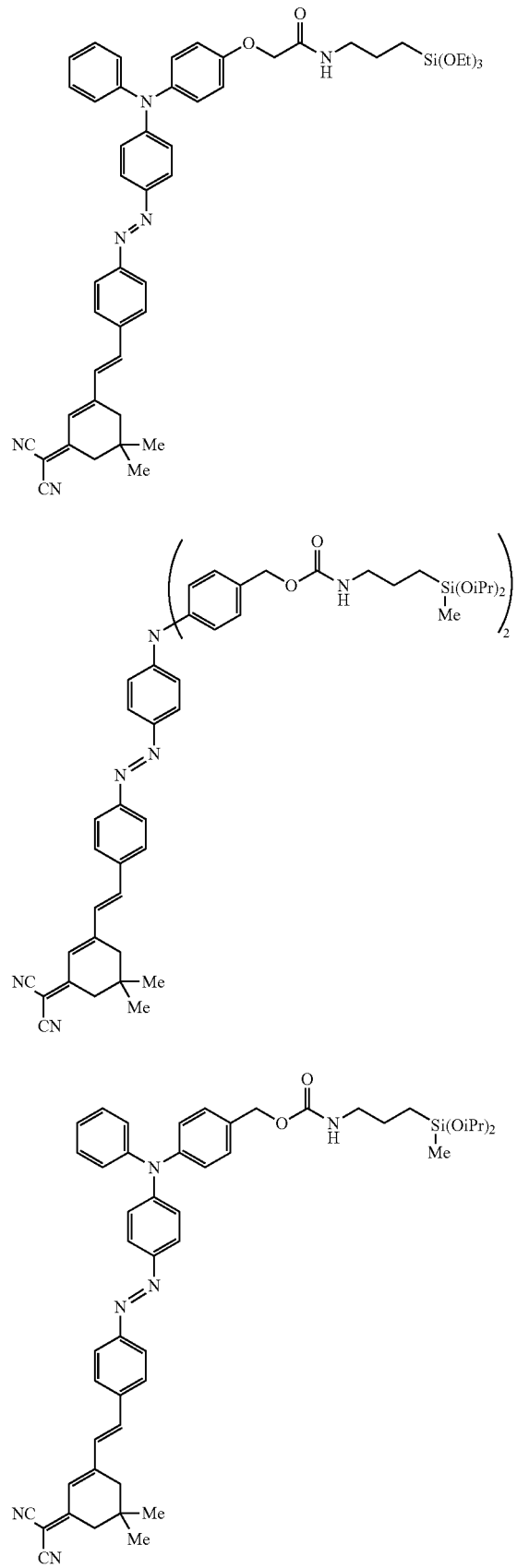

-continued

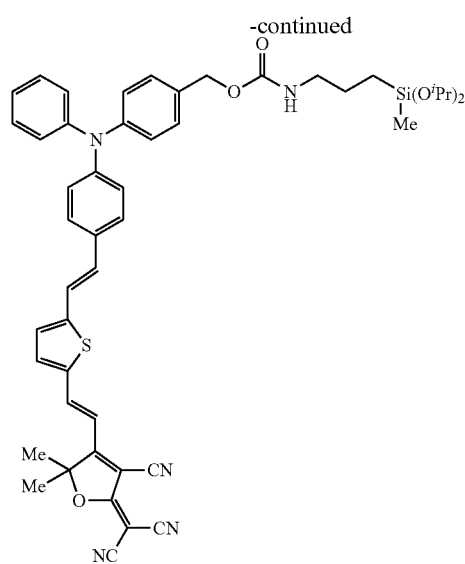

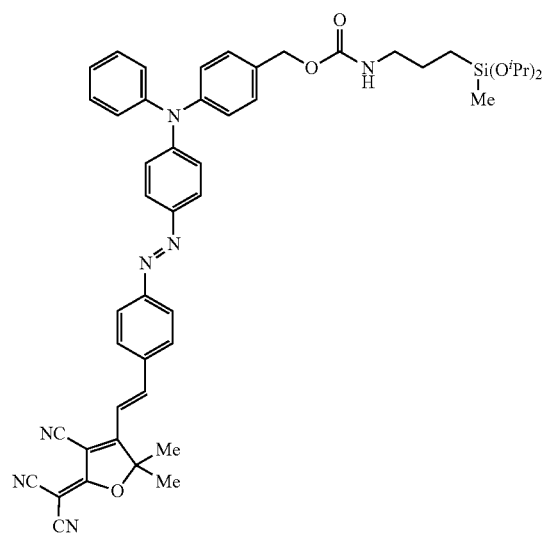

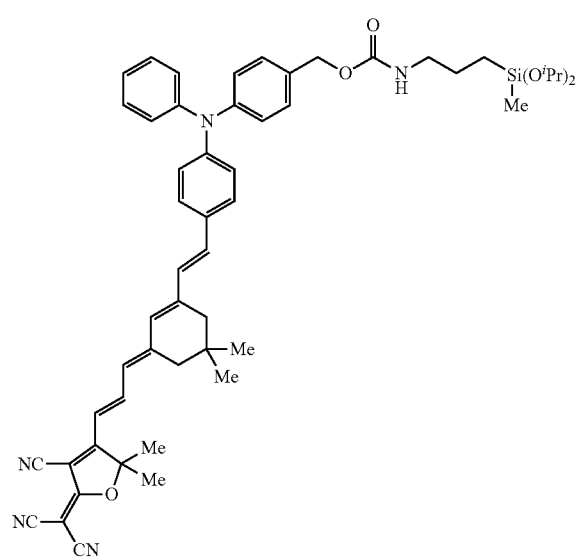

Matrix Forming Compound Having One or More Hydrolysable Silyl Groups

The matrix-forming compounds having hydrolysable silyl groups favorably used in the second stock solution according to the invention are represented by the following Formula (5):

$$T(-X)_i \qquad \text{Formula (5)}$$

In Formula (5), T is an aliphatic hydrocarbon group having 2 to 20 carbons which may have a branched chain, a ring structure, an unsaturated bond, or a hetero atom; a substituted or unsubstituted aromatic group; a hetero atom-containing aromatic group substituted or unsubstituted; or a combination thereof, which may have additionally at least one group selected from —NH—, —CO—, —O—, —S—, and —Si—. X represents a hydrolysable silyl group having a structure substantial identical with the structure represented by Formula (4) in the similar manner to Y in the Formula (3) (wherein, R, Q, and n in Formula (4) are independent respectively in Y and X). Further, i is an integer of 1 or more.

A plurality of nonlinear-optically active organic compounds having one or more hydrolysable silyl groups represented by the Formula (1) may be used together in the first stock solution according to the invention, and a plurality of nonlinear-optically active organic compounds having one or more hydrolysable silyl groups represented by the Formula (2) and a plurality of matrix-forming compounds having hydrolysable silyl groups may be used together in the second stock solution. In such cases, the hydrolysable silyl groups may have the same structure or different structures respectively, but preferably have at least similar hydrolysable groups Q, which are hydrolyzed in a similar manner, because these compounds are cocross-linked more uniformly.

The structure represented by T in Formula (5) provides the matrix-forming compound having hydrolysable silyl groups with a suitable degree of flexibility, and thus exerts favorable effects of absorbing the shrinkage deformation in the curing by cross-linking step and thus preventing generation of cracks; and reducing the concentration of hydroxysilyl groups remaining uncross-linked when a cross-linked cured film is formed by using the stock solution according to the invention containing the same. Although the advantageous effects may be exerted by a matrix-forming compound having only one hydrolysable silyl group, but the effects are particularly significant when T is an organic group having two or more carbons which may have substituents and two or more hydrolysable silyl groups at the terminals of the matrix-forming compound. Examples of these hydrolysable silyl group-containing matrix-forming compounds are as follows:

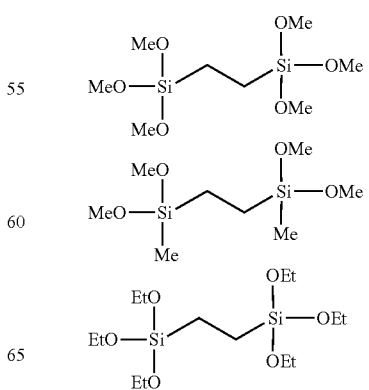

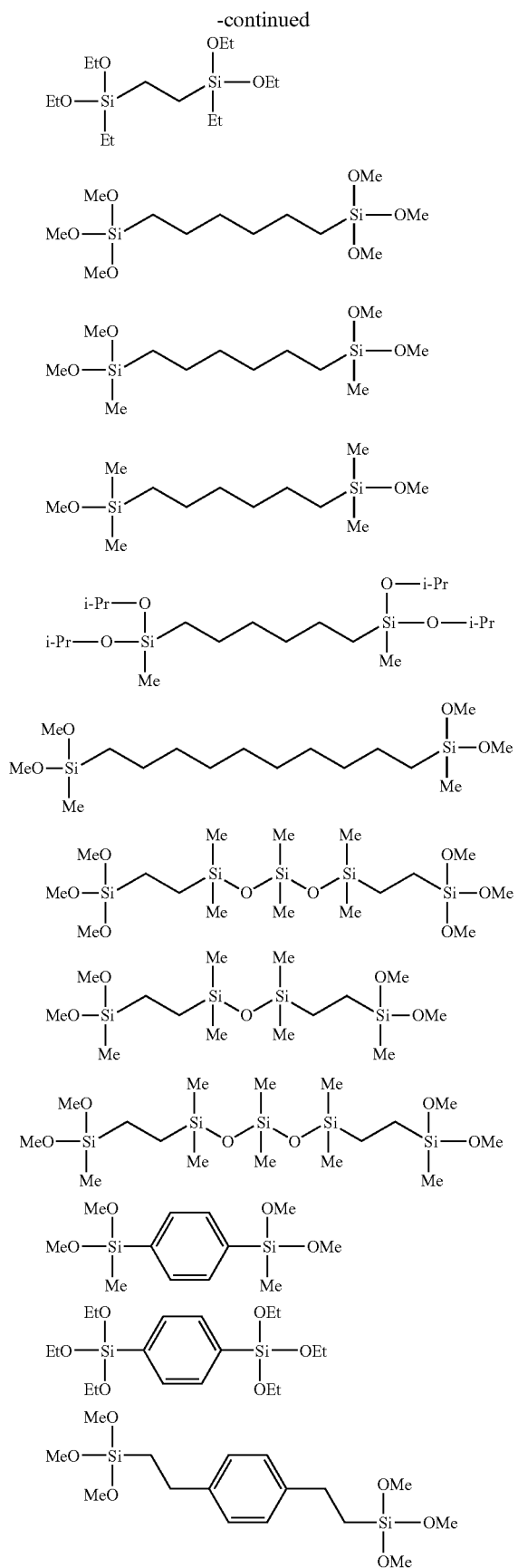

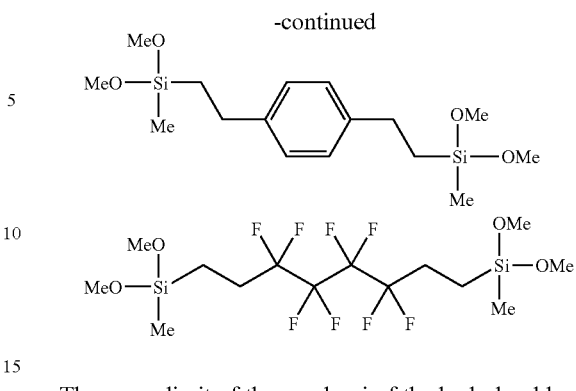

The upper limit of the number i of the hydrolysable silyl groups in Formula (5) is not particularly limited, but preferably not more than four. If i is larger than 4, the cross-linked matrix formed is less flexible, sometimes leading to problems of generation of cracks, a greater number of hydroxysilyl groups remaining uncross-linked, and the like.

The matrix-forming compounds having hydrolysable silyl groups are not limited to the examples above, and any publicly known compounds used in the ordinary sol-gel process may also be utilized. Examples thereof include tetramethoxysilane, tetraethoxysilane, methyltrimethoxysilane, dimethyldimethoxysilane, vinyltrichlorosilane, vinyltrimethoxysilane, vinyltriethoxysilane, 3-glycidoxypropylmethyldiethoxysilane, 3-glycidoxypropyltrimethoxysilane, 3-glycidoxypropyltriethoxysilane, 3-aminopropyltriethoxysilane, 3-aminopropyltrimethoxysilane, 3-aminopropylmethyldimethoxysilane, N-(2-aminoethyl)-3-aminopropyltriethoxysilane, and the like.

In addition, any component co-cross-linkable with a hydroxysilyl group may be added as needed to the first and second stock solutions. For example, alkoxide derivatives of metals such as germanium, titanium, zirconium, and aluminum may be added for the purpose of increasing the refractive index of the resulting optical materials.

Hydrolysis and Catalyst-Separation Treatments

The stock solution according to the invention is preferably prepared by subjecting a solution containing the compounds having one or more hydrolysable silyl groups to the hydrolysis and catalyst-separation treatments as will be described below.

A solid catalyst is preferably used as the catalyst for promoting the hydrolysis of the hydrolysable silyl groups. As described above, when a stock solution was prepared by sol-gel process using the compound having one or more hydrolysable silyl groups, easily soluble homogeneous catalysts including acid catalysts such as hydrochloric acid and acetic acid, base catalysts such as pyridine and triethyl amine, and the like have been conventionally used as the catalyst.

These catalysts show catalytic activity not only in the hydrolysis reaction but also in the subsequent polycondensation reaction. Although the method employing the homogeneous catalyst is convenient, the reactivity is too high and it is difficult to remove the catalyst form the stock solution and stop the catalytic reactions practically at a desired level, consequently leading to the problems in controlling the quality and the pot life of the stock solution and the like.

In contrast if a solid catalyst is used, the hydrolysis reaction proceeds at a slower speed only on the surface of the solid, and it becomes easier to control the progress of reaction and avoid undesirable side reactions. Further as the catalyst can be removed by a simple operation such as filtration, solid catalysts have an advantage that the hydrolysis and subsequent polycondensation reactions can be stopped at a desired level.

The solid catalyst is not particularly limited if it is insoluble in the solution and the hydrolysable silyl group gives a hydroxysilyl group by hydrolysis, and specific examples thereof are described below. These catalysts may be used alone or in combination.

Examples of the solid catalysts include ion exchange resins such as AMBERLITE® 15, AMBERLITE® 200C, AMBERLYST® 15, and AMBERLYST® 15E (heretofore, manufactured by Rohm and Haas Company); DOWEX® MWC-1-H, DOWEX® 88, and DOWEX® HCR-W2 (heretofore, manufactured by Dow Chemical); Lewatit® SPC-108 and Lewatit® SPC-118 (heretofore, manufactured by Bayer); DIAION RCP-150H (trade name, manufactured by Mitsubishi Chemical Corporation); Sumikaion KC-470, Duolite C26-C, Duolite C-433, and Duolite-464 (heretofore, manufactured by Sumitomo Chemical); Nafion®-H (manufactured by Du Pond); and Purolite (manufactured by AMP Ionex);

- solid acids having a compound containing a protonic acid group such as $Zr(O_3PCH_2CH_2SO_3H)_2$ and $Th(O_3PCH_2CH_2COOH)_2$ bound to the surface thereof; polyorganosiloxanes containing a protonic acid group such as polyorganosiloxanes containing a sulfonic acid group; heteropoly acids such as cobaltic/tungstic acid and phosphomolybdic acid; isopoly acids such as niobic acid, tantalic acid, and molybdenic acid; single metal oxides such as silica gel, alumina, chromia, zirconia, CaO, and MgO; complex metal oxides such as silica-alumina, silica-magnesia, silica-zirconia, and zeolites;
- clay minerals such as acid clay, activated clay, montmorillonite, and kaolinite; metal phosphate salts such as zirconia phosphate and lanthanum phosphate; solid bases having a compound containing an amino group bound on the surface thereof such as solids obtained by reacting 3-aminopropyltriethoxysilane with the surface of silica gel; polyorganosiloxanes having an amino group such as amino-modified silicone resins; and the like.

For preparation of stock solutions using the solid catalyst above, it is necessary at least to subject the solution to a hydrolysis step wherein it is brought into contact with the solid catalyst and hydrolyzed and to a catalyst-separation step wherein the solution after the hydrolysis step is separated from the solid catalyst.

The hydrolysis step is not particularly limited, if the step allows hydrolysis by bringing the solution into contact with the solid catalyst for a certain time. The kind, amount, shape, and the like of the solid catalyst used are selected properly according to the processing conditions (temperature and the like) and the matrix-forming compound and/or nonlinear-optically active organic compound present in the stock solution, so that desired coatability and film thickness can be obtained. The catalyst-separation step is also not particularly limited, if the step can eliminate the solid catalyst in the solution after the hydrolysis step.

The contact to and removal from the solid catalyst of the solution in the hydrolysis and catalyst-separation steps may be continuously performed by passing the solution through a column filled with porous or fibrous carriers supporting the solid catalyst. Alternatively, such processing may be performed batchwise. For example, after hydrolysis by dispersing a particulate solid catalyst in the solution, the solid catalyst may be filtered through a filter such as filter paper, filter cloth, membrane filter, glass filter, cotton filter, or the like under atmospheric, reduced, or increased pressure; or after the solution is stirred for a certain time in a reaction container having the solid catalyst coated on the internal wall thereof, the solution may be transferred to another container.

The amount of the solid catalyst used is not particularly limited, but preferably in the range of 0.001 to 20%, more preferably in the range of 0.01 to 10% by mass with respect to the total amount of the compounds having one or more hydrolysable silyl groups contained in the stock solution.

The temperature of the reaction with the solid catalyst may vary depending on the kinds of the solid catalyst used and the components contained in the stock solution, but usually in the range of 0 to 100° C., more preferably in the range of 5 to 70° C., and particularly more preferably in the range of 10 to 50° C.

The reaction time varies depending on the method of contact between the solid catalyst and the stock solution and also on the temperature of reaction, but is preferably in the range of 10 minutes to 100 hours, as a prolonged reaction time may lead to gelation of the solution.

Other Additives

The solution obtained after hydrolysis and catalyst-separation may be used as it is as the stock solution, but the following various additives may be added as needed.

To the stock solution according to the invention, it is preferable to add a curing catalyst for accelerating the curing by cross-linking reaction, in particular, a curing catalyst that is activated by energy such as heat or light provided externally, from the viewpoint of pot life.

The curing catalyst should be selected properly according to the cross-linkable functional groups used, and examples thereof include protonic acids such as hydrochloric acid, acetic acid, phosphoric acid, and sulfuric acid; bases such as ammonia and triethyl amine; organic tin compounds such as dibutyltin diacetate, dibutyltin dioctanoate; titanium compounds such as titanium tetrabutoxide, titanium tetraisopropoxide, and acetylacetonatotitanium tributoxide; zirconium compounds such as acetylacetonatozirconium tributoxide; aluminum compounds such as aluminum tributoxide, tri-acetylacetonatoaluminium, and aluminum triacetylacetate; iron, manganese, cobalt, zinc, and zirconium salts of organic carboxylic acids; publicly known photochemical radical generators: publicly known thermal radical generators; publicly known photochemical acid generators; publicly known photochemical base generators; and the like.

In particular when the cross-linkable functional group according to the invention is a hydrolysable silyl group, acetylacetonato complexes of metals are preferable among them from the viewpoints of the storage stability of stock solution, the adverse effects of residual catalyst, and the like. In such a case, addition of acetylacetone may further increase the storage stability of the stock solution.

If one of the homogeneous catalysts described above including protonic acids, such as hydrochloric acid, acetic acid, phosphoric acid, and sulfuric acid, is used as the curing catalyst, addition thereof should be reduced to the minimum amount required for practically promoting the catalytic reaction by heating, for prevention of the decrease in pot life at room temperature.

The amount of the curing catalyst added is not particularly limited, but preferably in the range of 0.1 to 20%, more preferably in the range of 0.3 to 10% by mass with respect to the total amount of the compounds having one or more cross-linkable functional groups contained in the stock solution, from the viewpoints of the pot life, curing temperature, and others of the stock solution.

To the stock solution according to the invention, for example, a publicly known antioxidant such as 2,6-di-t-butyl- 4-methylphenol and hydroquinone may be added for prevention of oxidative degradation of the nonlinear-optically active organic compound; and a publicly known UV absorbent such as 2,4-dihydroxybenzophenone and 2-hydroxy-4-methoxybenzophenone may be added for prevention of ultraviolet degradation of the nonlinear-optically active organic compound. Further, a publicly known leveling agent such as a silicone oil may be added for the purpose of improving smoothness of the surface of coated films; a publicly known polycondensation inhibitor, for improving the pot life; a publicly known curing aid, for accelerating curing by cross-linking; or a publicly known functional material for granting a function other than the nonlinear-optical function.

In addition, a resin such as polyvinyl alcohol, polyvinyl butyral, polyvinyl acetal, polyurethane, polyamide, polyvinyl acetate, polyvinylpyrrolidone, polyvinylpyridine, or a polymeric compound having an alkoxy silyl group as the side chain, or a copolymer thereof may be added for the purpose of adjusting (thickening) the viscosity of the stock solution.

The solvents used for the stock solution include alcohols (e.g., methanol, ethanol, propanol, butanol, and the like), ketones (e.g., acetone, methylethylketone, cyclopentanone, cyclohexanone, and the like), ethers (e.g., tetrahydrofuran, 2-methyltetrahydrofuran, diethylether, dioxane, and the like), esters (e.g., ethyl acetate and isopropyl acetate), aromatic compounds (e.g., benzene, toluene, xylene, chlorobenzene and tetrahydronaphthalene), amides (e.g., dimethylformamide and dimethylacetamide), dimethylsulfoxide, and the like. These solvents may be used alone or in combination of two or more solvents.

The content of the solvent in stock solution is not particularly limited, but as solid matters tend to precipitate if the solvent content is too low, the content of the components other than solvent in the stock solution is preferably adjusted in the range of 0.5 to 30% by mass.

When a compound having one or more hydrolysable silyl groups is used as the cross-linkable functional group, water should be added to the stock solution at least in the hydrolysis step. The amount of added water is not particularly limited, but is preferably in the range of 30 to 500% by mole, more preferably in the range of 50 to 300% by mole with respect to the theoretical amount required for complete hydrolysis of all hydrolysable silyl groups contained in the solution, for improving the storage stability of stock solution and suppressing sedimentation and phase separation of the organic components in the stock solution.

A water content of more than 500% by mole may lead to deterioration of the storage stability of stock solution and precipitation of organic components. The problem may be avoided sometimes by mixing with an alcohol. On the other hand, a water content of less than 30% by mole may leave most of the hydrolysable silyl groups unhydrolyzed, making the curing by cross-linking more difficult to proceed.

The added water still remaining after the hydrolysis reaction may be removed by distillation, absorption, or the like.

Nonlinear-Optical Material

Hereinafter, nonlinear-optical materials prepared by using the stock solution according to the invention will be described.

The production method and the shape of the nonlinear-optical materials according to the invention are not particularly limited if the materials are produced using the stock solution according to the invention. For example, bulk nonlinear-optical materials may be produced by pouring the stock solution into a mold and curing by cross-linking the solution therein, or film-shaped nonlinear-optical materials, by coating the stock solution onto the surface of substrates in any shape including plate and fiber and curing by cross-linking the solution thereon.

Hereinafter, nonlinear-optical materials and processes of manufacturing the same will be described, assuming that a thin-film nonlinear-optical material is produced by coating a stock solution on a substrate surface.

The method of coating the stock solution is not particularly limited, and examples thereof include publicly known wet coating methods such as spin-coating, spray-coating, blade-coating, dip-coating, and ink jet methods.

After coated on the substrate surface, the stock solution is cross-linked and cured. The curing by cross-linking may be caused naturally by evaporation of the solvent under ambient environment, but it is more preferable to remove the solvent forcibly, for example, under reduced pressure and then cause the curing reaction by the heat, ultraviolet irradiation, or the like supplied externally by using the curing catalyst previously added to the stock solution.

To induce a second-order nonlinear-optical activity in a nonlinear-optical material, it is necessary, as described above, to orient the nonlinear-optically active organic compound by some orientation means.

One of the methods for orienting the nonlinear-optically active organic compound is to apply a stock solution onto a substrate having an oriented film on the surface thereof and induce orientation of the nonlinear-optically active organic compound contained in the nonlinear-optical material by the orientation of the oriented film. Alternatively, publicly known poling methods such as photopoling, photoassisted electric-field poling, and electric-field poling may also be effectively used. Among them, the electric field-poling method is particularly preferable, from the points of the convenience of equipment, the degree of orientation of the resulting films, and the like.

The electric field-poling method is an orientation method of orienting a nonlinear-optically active organic compound in the direction of applied electric field, by mutual interaction of the dipole moment of the nonlinear-optically active organic compound and the Coulomb force of the applied electric field. In the process by the electric field-poling method, the orientation of the nonlinear-optically active organic compound in the direction of electric field is commonly accelerated by heating while the electric field is applied and terminating the application of electric field after sufficient orientation is induced. The electric-field poling of the cross-linkable nonlinear-optical material according to the invention is performed during or before curing by cross-linking. In this manner, the orientation induced by the electric-field poling is frozen or stabilized by curing by cross-linking.

Accordingly, the orientation treatment in an elastic state and subsequent cross-link and curing treatment enable stabilization of the oriented state, allowing a high degree of orientation and the preservation of the induced orientation. However, if the orientation treatment by electric-field poling is attempted in a state completely without curing by cross-linking at all, the resistance of the film is so low that an effective poling electric field cannot be applied, sometimes resulting in a low degree of orientation. The problem may be avoided by partially progressing the curing by cross-linking reaction before the electric-field poling treatment or by employing a photoassisted electric field-poling or photopoling method as the orientation method.

When the heat-curing and electric-field poling treatments are performed at the same time, the temperature may be raised rapidly to the curing-reaction temperature while applying an electric field, but in such a case, the curing reaction progresses rapidly before sufficient orientation is induced, restricting the movement of the nonlinear-optically active organic compound and consequently prohibiting effective orientation.

Therefore, methods of raising the temperature gradually or stepwise while applying an electric field are more effective in the case above.

The intensity of the applied electric field during the electric-field poling treatment may be constant or varied continuously or stepwise. Alternatively, an electric field changing periodically may also be applied.

Any one of the methods known in the art may be used as the method for applying electric field to the nonlinear-optical material in the electric-field poling treatment, and examples thereof include discharge methods of discharging a nonlinear-optical material by using a needle-shaped, wire-shaped, comb-shaped, plate-shaped, or other electrode, or an electrode above having an additional grid electrode connected thereto; and contact-electrode methods of applying an electric field by connecting a pair of electrodes to the nonlinear-optical material.

In the case of the contact-electrode methods above, the electrodes may be formed directly on the surface of nonlinear-optical material, or the electrodes may be brought to the vicinity of or into contact with the nonlinear-optical material only during the electric-field poling treatment. Materials for the electrodes which may be formed on the film surface include various metals such as gold, aluminum, nickel, chromium, and palladium, and the alloys thereof; electrically conductive metal oxides; electrically conductive polymers; and the like.

Commonly practiced vapor deposition and spattering may be used as the method for forming electrodes directly on the film surface. The electrode materials above and those having a conductive film formed on a nonconductive substrate surface such as glass and plastics may be used as the electrodes which are brought to the vicinity of or into contact with the film.

The electric-field poling treatment may be performed in the air, but is preferably performed under an inactive gas such as nitrogen or argon or under reduced pressure. The discharge method under such an environment provides advantages of allowing prevention of degradation of the nonlinear-optical material due to oxygen in the air, discharge products, or the like, and of unnecessary spark discharge often found when a high-electric field is applied by the electrode method.

Nonlinear-Optical Device

The nonlinear-optical material according to the invention thus obtained may be applied to any devices in any shape that use the nonlinear-optical function, for example, to wavelength-converting devices in the shape of a thin film formed on a transparent substrate. It may also be applied to the core or other layers for electro-optical devices having a waveguide structure.

Hereinafter, a waveguide-type electro-optical device having a core layer formed with the nonlinear-optical material according to the invention, a preferable embodiment of the present invention will be described in detail.

The favorable configurations of the waveguide-type electro-optical device, a nonlinear-optical device according to the invention, are not particular limited, and include various configurations. For example in devices consisting of a plurality of layers, at least one layer thereof may be formed with the stock solution according to the invention, but the core layer wherein the light transmits is preferably formed with the stock solution according to the invention. In such a case, the materials used for other layers are not particularly restricted.

Examples of the configuration of waveguide-type electro-optical devices, nonlinear-optical devices according to the invention, are shown as schematic cross-sectional views in FIGS. 1 to 4.

The waveguide-type electro-optical device preferably has a configuration comprising at least a lower cladding layer and a core layer on the substrate surface, and preferably a configuration as shown in FIG. 1 wherein an upper cladding layer 2 is also constructed.

When used as the core layer for waveguide-type electro-optical devices, the nonlinear-optical material according to the invention provides the resulting device with excellent nonlinear-optical characteristics and ensures high stability. When used as the core layer for nonlinear-optical materials according to the invention, the nonlinear-optical material according to the invention prevents the problem of erosion of the core layer, when an upper cladding layer is additionally formed on the aforementioned polymeric nonlinear-optical material or when patterning of the core layer and the top electrode is performed, as will be described below.

In the waveguide-type electro-optical devices prepared from the nonlinear-optical device according to the invention, a pair of electrodes for applying an electric field should be connected to at least to the layer containing the nonlinear-optical material according to the invention for driving the devices. As shown in FIG. 1, a pair of electrodes, bottom electrode 5 and top electrode 1, preferably sandwiches the waveguide layer consisting of a lower cladding layer 4, a core layer 3, and an upper cladding layer 2.

The materials constituting the substrate 6 include metals such as aluminum, gold, iron, nickel, chromium, and titanium; semiconductors such as silicon, gallium-arsenic, indium-phosphorus, titanium oxide, and zinc oxide; ceramics such as glass; plastics such as polyethylene terephthalate, polyethylene naphthalate, polycarbonate, polysulfone, polyether ketone, and polyimide; and the like.

An electrically conductive film may be formed on the surface of these substrate materials, and the materials for the electrically conductive films include metals such as aluminum, gold, nickel, chromium, and titanium; electrically conductive oxides such as tin oxide, indium oxide, ITO (mixed tin and indium oxide); electrically conductive polymers such as polythiophene, polyaniline, poly-p-phenylene vinylene, and polyacetylene; and the like. These electrically conductive films may be formed by any one of the publicly known dry coating methods such as vapor deposition and spattering; or of publicly known wet coating methods such as spray coating, dip-coating, and electrolytic precipitation, and patterns may be formed thereon as needed. The electrically conductive substrates or the electrically conductive films formed on substrates are used as electrodes (e.g., bottom electrode 5 in FIG. 1) for electric-field poling and for driving devices.

In addition, an adhesion layer for improving the adhesion between the substrate 6 and the film formed thereon, a leveling layer for smoothing the depression and projection of substrate surface, or an intermediate layer for providing these functions concurrently may be formed on the surface of substrate 6 as needed.

The materials used for forming these layers are not particularly limited, and examples thereof include publicly known materials including acrylic resin, methacrylic resin, amide resin, polyvinyl chloride resin, vinyl acetate resin, phenol resin, urethane resin, vinyl alcohol resin, acetal resin, and the like, or the copolymers thereof; and cross-linked or cocross-linked polymers of zirconium alkoxide compounds, titanium alkoxide compounds, and silane coupling agents; and the like.

As described above, nonlinear-optical device according to the invention preferably has a waveguide structure having one or more core layers and two cladding layers sandwiching the core layers, and the nonlinear-optical material according to the invention is particularly preferably contained in the waveguide core layers.

A lower cladding layer 4 is preferably formed between the substrate 6 and the core layer 3 containing the nonlinear-optical material according to the invention. The lower cladding layer 4 may be formed with any material, if it has a refractive index lower than that of the core layer 3 and is not damaged when the core layer is formed. Favorable materials there of include UV-curing or thermosetting acrylic, epoxy, silicone, and other resins; polyimide; $SiO_2$; and the like. Alternatively, the nonlinear-optical material according to the invention may also be used. However in such a case, the structure, content, and others of the nonlinear-optically active organic compound therein should be adjusted so that it has a refractive index smaller than the nonlinear-optically active organic compound used in the core layer 3.

After the core layer containing the nonlinear-optical material according to the invention is formed, an upper cladding layer 7 may additionally formed atop the core layer in the similar manner to the lower cladding layer 4. Thus, a slab waveguide having a configuration of cladding layer/core layer/upper cladding layer shown in FIG. 1 is formed.

After the core layer 3 is formed, the core layer 3 may be patterned to form a channel waveguide (FIG. 2) or a ridge waveguide (FIG. 3), by any one of methods known in the art using a semiconductor-processing technology such as reactive ion etching (RIE), wet etching photolithography, electron-beam lithography, and the like. Alternatively, the channel or ridge waveguide may be formed by irradiating a part of the core layer 3 with patterned UV light, electron beam, or the like, and thus changing the refractive index of the irradiated portion. Further, a reverse-ridge waveguide may also be formed by patterning the lower cladding layer 4 in advance by any one of methods known in the art using a semiconductor processing technology such as reactive ion etching (RIE), wet etching, photolithography, electron-beam lithography and the like, and forming a core layer 3 thereon.

A basic electro-optical device may be prepared by forming a top electrode 1 for driving the device at a desired portion of the surface of upper cladding layer 2.

Any one of coating methods publicly known such as spin-coating, spray-coating, blade-coating, dip-coating, and ink jet may be used as the method for forming the cladding layer above and the core layer 3. The solvent therein may be removed by natural evaporation or forcibly, for example, by heating in a heat dryer or the like or under reduced pressure in a vacuum dryer or the like.

If the cladding layer and the core layer 3 are formed with a curing by cross-linking material such as the nonlinear-optical material according to the invention, each layer may be cross-linked and cured completely by heating or UV irradiation when the layer is formed, or only partly to such a degree that the layer is not eroded when another layer is coated thereon. In particular, if there are problems of repellence when a layer is formed on another layer and of improper adhesion of the two layers, partial curing by cross-linking may sometimes remedy these problems. By keeping the degree of curing by cross-linking of the lower cladding layer 4 only partial and the resistance thereof lower, it is possible to apply a more effective poling electric field to the core layer 3 when the core layer 3 is subjected to an electric-field poling treatment and thus to obtain a higher degree of orientation.

The film thickness of the lower cladding layer 4 may vary according to the wavelength, mode, and the like of the light used, but preferably in the range of about 0.1 to 2,000 μm, and more preferably in the range of about 1 to 100 μm.

The film thickness of the core layer 3 varies according to the wavelength, mode, or the like of the light used, but is preferably in the range of about 0.1 to 500 μm, and more preferably in the range of about 0.5 to 50 μm.

If the core layer 3 is formed with the nonlinear-optical material according to the invention, it is preferable to conduct heat curing and poling simultaneously after application of the stock solution and removal of the solvent. The solvent removal and the curing may be conducted at the same time. The methods similar to those described for the nonlinear-optical material according to the invention may be applied as the method for the poling treatment.

In the case of electric-field poling treatment, the heating temperature is preferably a temperature allowing almost complete curing by cross-linking of the core layer 3 in the final phase, and more specifically, it is preferable to keep the core layer at a temperature in the range of 100 to 200° C. for about 0.1 to 10 hours. If the poling temperature is raised stepwise from room temperature to the final temperature, the difference between the steps is preferably in the range of about 5 to 50° C. and the period of each step about 5 to 120 minutes, and the temperature differences and the periods above may be the same or different. If the poling temperature is raised continuously, the rate of temperature increase is preferably about 0.1 to 20° C./min. The temperature may be raised both in the continuous and stepwise manner.

The location of the electrode, grid, and sample surface is arbitrary if they are in that order during treatment by the discharge method, but the distance between the electrode and the sample surface is preferably in the range of about 5 to 100 mm, and the minimum distance between the grid and the sample surface is in the range of about 1 to 30 mm. Use of the grid may sometimes stabilizes discharging and allows prevention of the influx of excessive ion stream onto the sample surface, thus providing an advantageous effect of suppressing the damage of the sample surface due to discharge products.

During the electric-field poling treatment, the voltage applied to the electrode and the grid may be constant or changed continuously or in stepwise, according to or not according to the timing of temperature increase or decrease. For example, the voltage applied to the electrode is preferably in the range of about 1 to 20 kV, and the voltage applied to the grid when used, in the range of about 0.1 to 2 kV.

Alternatively, the voltage applied to the electrode during poling by the electrode method is preferably in the range of about 0.1 to 2 kV. The polarity of the electrode may be positive or negative, but in the case of the discharge method, a positive sample surface, i.e., positive discharge, enables reduction in the amount of ozone, nitrous oxide, and the like generated by discharging and thus in the degree of damage of the sample.

The total period of poling including the step for lowering the temperature is preferably not more than 24 hours.

An indicator employed for examining whether the poling is effective or not is a numerical value (order parameter: $\phi$) indicating how many nonlinear-optical molecules (generally exhibiting dichroism) are oriented in the direction of electric field. Specifically, if the absorbance when the molecules are randomly oriented is designated as A0 and the absorbance when the molecules are oriented in the electric-field direction (film-thickness direction) as At, the value $\phi$ may be calculated by the formula 1—(At/A0).

The order parameter above has a numerical value of 1 in the ideal condition when all molecules are oriented completely, and 0 when the molecules are completely random, and thus a greater value indicates a higher degree of orientation of molecules as a whole. Determination of this value allows judgment of the efficiency of poling and the stability of orientation.

In addition to materials similar to those for the lower cladding layer described above, various thermoplastic resins commonly used for polymer waveguides may be used for the upper cladding layer 2. Examples of these thermoplastic resins include polycarbonate, polyester, polyacrylate, polymethyl (meth)acrylate, polyimide, polyamide, polystyrene, polycyclic olefin, and the like. The core layer 3 according to the invention, which is already cross-linked and cured, is superior in orientation stability and solvent resistance and thus has an advantage that it provide a greater number of options in selecting the coating method and the material for the upper cladding layer and the solvent for coating the same.

If an upper cladding layer 2 is formed on the surface of a core layer 3, the poling treatment may be performed after the upper cladding layer 2 is formed. For example, after the core layer 3 is coated, and deprived of the solvent and partially cross-linked and cured as needed, the poling treatment may be performed in the state wherein an upper cladding layer 2 formed or in the state wherein a top electrode 1 is additionally formed.

The film thickness of the upper cladding layer 2 varies depending on the wavelength, mode, and the like of the light used, but is preferably in the range of about 0.1 to 2,000 μm, and more preferably in the range of about 1 to 100 μm.

If the nonlinear-optical device according to the invention is used in the configuration of waveguide as described above, it is necessary to make the refractive index of the cladding layer smaller than that of the core layer 3 in order to confine the light in the core layer 3 by the difference in refractive index. The difference in refractive index between the core layer 3 and the cladding layer varies according to the mode and the like. For example, when used as a single-mode waveguide, the difference in refractive index between the core layer 3 and cladding layer is preferably in the range of 0.01 to 30%, and more preferably in the range of 0.1 to 10%.

The method of patterning the core layer 3 by irradiating patterned UV light described above is generally known by the name of photobleaching method. In this case, publicly known lamps including (high-pressure) mercury arc lamp, xenon short-arc lamp, (metal) halogen lamp, black light, D2 lamp, various lasers, and the like may be used as the UV light source. For example, if a high-pressure mercury arc lamp is used, the irradiation intensity is preferably about 5 to 1,000 mW, and the period of irradiation is about 1 minute to 200 hours. If a mask pattern is used for patternization, a method known in the art such as metal mask method may be used as it is.

The step of patterning the core layer 3 by the photobleaching method may precede the poling treatment if the core layer is already coated, but preferably follows the cross-link curing and poling treatment. Alternatively, the patterning may be performed after the upper cladding layer 2 and the top electrode 1 are further formed.

When a channel or ridge waveguide is formed in the manner described above, the pattern of the core layer 3 may be any one of publicly known device structures such as straight line, Y-branched, directional coupler, and Mach-Zehnder types, and in such a configuration, the nonlinear-optical device according to the invention can be applied to known optical telecommunication devices such as optical switch, optical modulator, and phase-shifting device.

EXAMPLES

Hereinafter, the present invention will be described in more detail with reference to Examples, but it should be understood that the invention is not limited thereto.

Example 1

Preparation of Stock Solution A

To a solution wherein the composition below is mixed and dissolved well, 0.6 part by mass of an ion exchange resin (AMBERLYST® 15E, manufactured by Rohm and Haas Company) is added as a solid catalyst. The slurry is stirred and reacted (hydrolysis treatment) at room temperature for one hour and filtered through a membrane filter to remove the ion exchange resin (catalyst-separation treatment). To the solution, 0.06 part by mass of aluminum trisacetylacetonate and 0.06 part by mass of acetylacetone are added respectively as a heat-curing catalyst and a curing inhibitor, to give a stock solution A for production of nonlinear-optical materials.

Nonlinear-optically active organic compound having two hydrolysable silyl groups represented by Structural Formula (1-1): 1 part by mass
Distilled water: 0.2 part by mass
Methanol: 1 part by mass
Tetrahydrofuran: 4 parts by mass
Cyclohexanone: 18 parts by mass

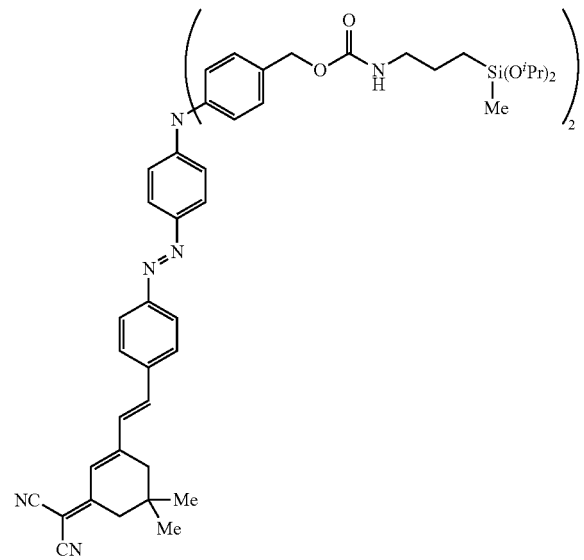

Structural Formula (1-1)

The stock solution A is immediately transferred into a sealed container and stored at room temperature and atmospheric pressure, until the solution A is used for coating. The pot life of the solution A under the sealed condition is determined by visual observation. The solution is very stable as there are no change in viscosity and no precipitation of solid matters observed after 10 days.

Preparation and Evaluation of Nonlinear-Optical Material (Cross-Linked Cured Film A)

Subsequently, the stock solution A is coated onto an ITO surface coated on a glass substrate (thickness: 1 mm; surface resistance: 10 Ω/□) by the spin-coating method, air-dried for 10 minutes, and additionally dried under reduced pressure in a vacuum desiccator at room temperature for 12 hours, to give sample A.

Subsequently, the coated sample A is placed on a hot plate with the coated film facing upward and subjected to heat curing and electric-field poling treatments, to give a nonlinear-optical material according to the invention. The electric-field poling treatment is performed by the discharge method using a scorotron electrode, wherein the voltage applied to the wire electrode is 5 kV; the voltage applied to the grid electrode is 100 V; and the distance between the coated film and the surface of grid electrode is 2 mm. After application of the voltage, the temperature of the hot plate is gradually raised from room temperature to 130° C. over a period of one hour, kept at 130° C. for 30 minutes, and then lowered to room temperature over a period of about 30 minutes under the conditions above, and then the application of voltage is discontinued. In this manner, the electric-field poling and heat curing are performed simultaneously, to give a cross-linked cured film A (concentration of the nonlinear-optically active compound backbone: about 60% by mass).

The cross-linked cured film A after the electric-field poling treatment is a glossy clear film without any defects detectable by visual observation. The thickness of the film is about 0.5 μm.

In addition, evaluation of the change in poling state of the crosslinked cured film A over time reveals that the order parameters immediately after preparation and after stored in dark place for 10 days are both 0.3 and there is no relaxation of the orientation at all.

The order parameter is determined by measuring absorption spectra of a cured film 1 prepared without the poling treatment wherein the nonlinear-optically active compound is randomly oriented, and a cured film 2 prepared with the poling treatment wherein the nonlinear-optically active compound is oriented in the film thickness direction, by using a spectrophotometer (U-3000, manufactured by Hitachi); and calculating according to the following Equation (1) form the absorptions thereof at the wavelength of λmax, at which the light absorption of the cured films 1 and 2 is maximum.

$$\phi = 1 - At/A0 \qquad \text{Equation (1)}$$

In Equation (1), φ represents an order parameter; At represents the absorbance at the wavelength λmax of the cured film 2 after the poling treatment; and A0 represents the absorbance at the wavelength λmax of the cured film 1 before poling treatment.).

Observation of second harmonics at 775 nm generated by irradiation of a semiconductor laser beam having an oscillation wavelength of 1550 nm onto the cross-linked cured film A thus obtained confirms that the cross-linked cured film A, a nonlinear-optical material according to the invention, has a nonlinear-optical function. When the cross-linked cured film A is further irradiated with a laser beam once again after stored at a high temperature of 150° C. for one hour, generation of second harmonics at an intensity equivalent to that of the original film is observed, which confirms that the nonlinear-optical material according to the invention has high heat resistance.

The evaluation results above are summarized in Table 1.

Example 2

Preparation of Stock Solution B

To a solution wherein the composition below is mixed and dissolved well, 0.6 part by mass of an ion exchange resin (AMBERLYST® 15E, manufactured by Rohm and Haas Company) is added as a solid catalyst. The slurry is stirred and reacted at room temperature for one hour (hydrolysis treatment), and filtered through a membrane filter to remove the ion exchange resin (catalyst-separation treatment). To the solution, 0.06 part by mass of aluminum trisacetylacetonate and 0.06 part by mass of acetylacetone are added respectively as a heat-curing catalyst and a curing inhibitor, to give stock solution B.

Nonlinear-optically active organic compound not having a hydrolysable silyl groups represented by Structural Formula (2-1): 0.5 part by mass
Matrix-forming compound having two hydrolysable silyl groups represented by Structural Formula (2-2): 1 part by mass
Distilled water: 2.5 parts by mass
Methanol: 6 parts by mass
N,N-dimethylformamide: 18 parts by mass Structural Formula (2-1)

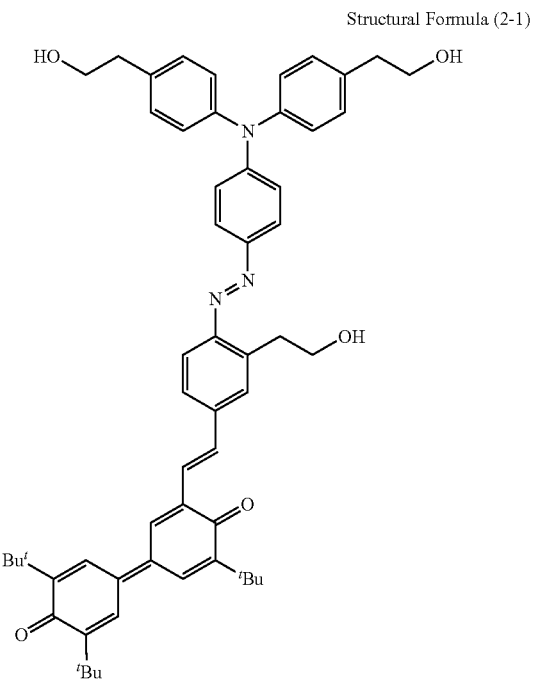

Structural Formula (2-2)

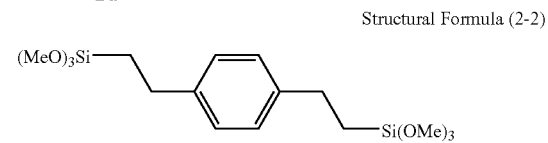

The stock solution B is immediately transferred into a sealed container and stored at room temperature and atmospheric pressure, until the solution A is used for coating. The pot life of the solution A under the sealed condition is determined by visual observation. The solution is very stable as there are no change in viscosity and no precipitation of solid matters after 10 days.

Preparation and Evaluation of Nonlinear-Optical Material (Cross-Linked Cured Film B), Subsequently, cross-linked cured film B (concentration of the nonlinear-optically active compound backbone: about 55% by mass), a nonlinear-optical material according to the invention, is prepared using the stock solution B in the similar manner to Example 1, and the film characteristics, nonlinear-optical characteristics, and the like are evaluated in the similar manner to Example 1.

The evaluation results thus obtained are summarized in Table 1.

Example 3

Preparation of Stock Solution C

To a solution wherein the composition below is mixed and dissolved well, 0.6 part by mass of an ion exchange resin (AMBERLYST® 15E, manufactured by Rohm and Haas Company) is added as a solid catalyst. The slurry is stirred and reacted at room temperature for one hour (hydrolysis treatment), and filtered through a membrane filter to remove the ion exchange resin (catalyst-separation treatment). To the solution, 0.06 part by mass of aluminum trisacetylacetonate and 0.06 part by mass of acetylacetone are added respectively as a heat-curing catalyst and a curing inhibitor, to give a stock solution C for production of nonlinear-optical materials.

Nonlinear-optically active organic compound having a hydrolysable silyl group represented by Structural Formula (3-1): 1.5 parts by mass Matrix forming compound having two hydrolysable silyl groups represented by Structural Formula (3-2): 0.5 part by mass Distilled water: 1.5 parts by mass Methanol: 6 parts by mass Tetrahydrofuran: 18 parts by mass

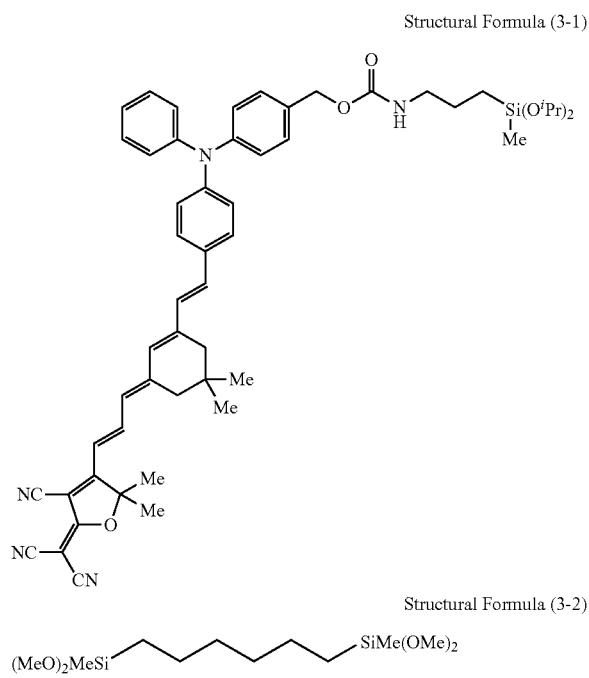

Structural Formula (3-1)

Structural Formula (3-2)

The stock solution A is immediately transferred into a sealed container and stored at room temperature and atmospheric pressure, until the solution A is used for coating. The pot life of the solution A under the sealed condition is determined by visual observation. The solution is very stable as there are no change in viscosity and no precipitation of solid matters after 10 days.

Preparation and Evaluation of Nonlinear-Optical Material (Cross-Linked Cured Film C)

Subsequently, cross-linked cured film C (concentration of the nonlinear-optically active compound backbone: about 70% by mass), a nonlinear-optical material according to the invention, is prepared using the stock solution C in the similar manner to Example 1, and the film characteristics, nonlinear-optical characteristics, and the like are evaluated in the similar manner to Example 1.

The evaluation results thus obtained are summarized in Table 1.

Example 4

Preparation of Stock Solution D

To a solution wherein the composition used in Example 1 is mixed and dissolved well, 0.06 part by mass of concentrated hydrochloric acid is added as a homogeneous catalyst replacing the solid catalyst used in Example 1. The resulting mixture is stirred well, to give stock solution D.

Preparation and Evaluation of Nonlinear-Optical Material (Cross-Linked Cured Film D)

Subsequently, cross-linked cured film D (concentration of the nonlinear-optically active compound backbone: about 60% by mass), a nonlinear-optical material according to the invention, is prepared using the stock solution D in the similar manner to Example 1, and the film characteristics, nonlinear-optical characteristics, and the like are evaluated in the similar manner to Example 1. The stock solution D should be coated immediately after preparation, as hydrolysis and dehydration condensation reactions proceed rapidly in the solution soon after addition of concentrated hydrochloric acid.

The evaluation results thus obtained are summarized in Table 1.

Comparative Example 1

Preparation of Stock Solution E

To a solution wherein the composition below is mixed and dissolved well, 0.6 part by mass of an ion exchange resin (AMBERLYST® 15E, manufactured by Rohm and Haas Company) is added as a solid catalyst. The slurry is stirred and reacted at room temperature for one hour and filtered through a membrane filter to remove the ion exchange resin. To the solution, 0.06 part by mass of aluminum trisacetylacetonate and 0.06 part by mass of acetylacetone are added respectively as a heat-curing catalyst and a curing inhibitor, to give a stock solution E for production of nonlinear-optical materials.

Nonlinear-optically active organic compound having a hydrolysable silyl groups represented by Structural Formula (4-1): 1.5 parts by mass Matrix-forming compound having two hydrolysable silyl groups represented by the Structural Formula (3-2): 0.5 part by mass Distilled water: 1.5 parts by mass Methanol: 6 parts by mass Tetrahydrofuran: 18 parts by mass Structural Formula (4-1)

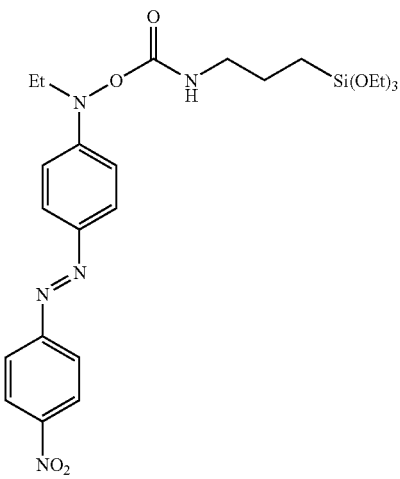

The stock solution E is immediately transferred into a sealed container and stored at room temperature and atmospheric pressure, until the solution E is used for coating. The pot life of the solution A under the sealed condition is determined by visual observation. The solution is very stable as there are no change in viscosity and no precipitation of solid matters after 10 days.

Preparation and Evaluation of Nonlinear-Optical Material (Cross-Linked Cured Film E)

Subsequently, cross-linked cured film E (concentration of the nonlinear-optically active compound backbone: about 60% by mass), a nonlinear-optical material according to the invention, is prepared using the stock solution E in the similar manner to Example 1, and the film characteristics, nonlinear-optical characteristics, and the like are evaluated in the similar manner to Example 1.

The evaluation results above are summarized in Table 1.

Comparative Example 2

A solution of 25 parts by mass of the aforementioned typical nonlinear-optically active organic compound, Disperse Red 1 (DR1, the structure being shown below) and 75 parts by mass of polymethyl methacrylate functioning as the polymer binder dissolved in 600 part by mass of cyclopentanone, is coated by the spin-coating method onto the glass substrate surface coated with ITO used in Example 1 and dried at 100° C. for 1 hour, to give a nonlinear-optical material (concentration of the nonlinear-optically active compound: about 25% by mass) having a film thickness of 0.5 μm.

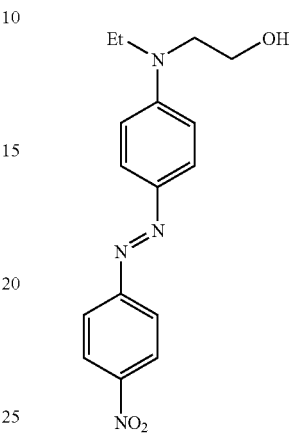

Disperse Red 1

The film characteristics, nonlinear-optical characteristics, and the like of this nonlinear-optical material are evaluated in the similar manner to Example 1. This nonlinear-optical material is not heated for curing by cross-linking during the poling, as it is a thermoplastic system.

The evaluation results thus obtained are summarized in Table 1.

Comparative Example 3

A solution of 55 parts by mass of DR1 and 45 parts by mass of polymethyl methacrylate in 600 parts by mass of cyclopentanone is coated onto the glass substrate surface coated with ITO used in Example 1 by the spin-coating method and dried at 100° C. for one hour. There is observed precipitation of DR1 microcrystals over the entire surface, prohibiting preparation of a clear film.

TABLE 1

|  | Pot life | Coatability | Stability of orientation | Nonlinear-optical characteristics | Stability of nonlinear-optical characteristics |
|---|---|---|---|---|---|
| Example 1 | A | A | A | A | A |
| Example 2 | A | A | B | B | B |
| Example 3 | A | A | A | A | A |
| Example 4 | C | B | A | A | A |
| Comparative Example 1 | A | A | A | C | A |
| Comparative Example 2 | A | A | C | C | C |
| Comparative Example 3 | A | C | — | — | — |

The evaluation items shown in Table 1 are classified respectively according to the following criteria.

Pot Life
A: Pot life of a week or more.
B: Pot life of less than one week.
C: Pot life of less than one hour.
(The pot life means a period of time wherein the stock solution is usable without increase in liquid viscosity or precipitation of solid matters.)

Coatability
A: No defects such as crack, phase separation, and film peeling detectable by visual observation.
B: Some defects slightly detectable by visual observation.
C: Some defects detectable over the entire surface by visual observation.

Stability of Orientation
A: Decrease in order parameter of less than 10% after storage in a dark place for 10 days.
B: decrease in order parameter of 10% or more after storage in a dark place for 10 days.

Nonlinear-Optical Characteristics
When the light intensity of the second harmonics generated in Example 1 is designated as level A, the nonlinear-optical characteristics are judged as follows:
A: Light intensity of the second harmonics generated is equivalent or more than that generated in Example 1.
B: Light intensity of the second harmonics generated is half or more of that generated in Example 1.
C: Light intensity of the second harmonics generated is less than half of that generated in Example 1.

Stability of Nonlinear-Optical Characteristics (Oriented State)
A: The light intensity of the second harmonics generated after storage at 150° C. for one hour is equivalent to that before storage.
B: The light intensity of the second harmonics generated after storage at 150° C. for one hour is half or more of that before storage.
C: The light intensity of the second harmonics generated after storage at 150° C. for one hour is less than half of that before storage.

Example 5

Figure 4:
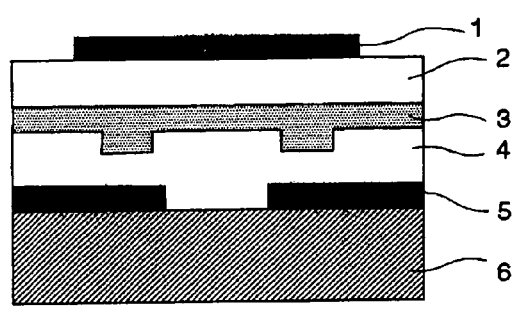
FIG. 4 is schematic cross-sectional view showing an embodiment of the nonlinear-optical device according to the invention, an optical modulator.

A Mach-Zehnder optical modulator (nonlinear-optical device) having a reverse-ridge waveguide structure set forth in FIG. 4 is prepared, using a nonlinear-optical material according to the invention.

First, a lower cladding layer 4 having a thickness of 5 µm is formed by using a UV-curing epoxy resin manufactured by Nagase ChemteX. Two grooves (waveguide channels) of 4 µm in width and 1 µm in depth are formed on the surface of this lower cladding layer 4 by reactive ion etching.

A core layer 3 having a thickness of 4 µm is formed on the surface of this lower cladding layer 4, using the stock solution C used in Example 3, and the core layer 3 is subjected, immediately after coating, to the heat curing and electric-field poling treatments in the similar manner to Example 3. An upper cladding layer 2 having a thickness of 3 µm is then formed by using a toluene solution of a polycyclic olefin resin manufactured by JSR. The interaction length is 2 cm.

After connecting a top electrode 1, the electro-optical characteristics of the optical modulator obtained are evaluated by measuring modulation of the output light intensity from an input laser beam at 1,318 nm while applying a drive voltage to the top electrode 1. The modulator is driven in the single-drive mode. As a result, an electro-optical effect that the intensity of output light is modulated according to the drive voltage applied is observed. The half-wave voltage, a measure of modulation capacity, is as high as about 5 V, indicating that the optical modulator has an excellent electro-optical characteristics. After storage at 150° C. for one hour, the optical modulation characteristics of the same optical modulator are evaluated. The optical modulator retained the same characteristics as those before storage, indicating that the optical modulator has extremely high thermal stability.

Comparative Example 4

An optical modulator (nonlinear-optical device) is prepared in a similar manner to Example 5, except that the core layer 3 is formed by using the stock solution E of Comparative Example 1 replacing the stock solution C of Example 5, and evaluated in the similar manner to Example 5.

As a result, an electro-optical effect that the intensity of output light is modulated according to the drive voltage applied is observed in a similar manner to Example 5. However, the half-wave voltage is very high at about 50 V, indicating that the optical modulator is significantly lower in electro-optical characteristics compared to the optical modulator of Example 5.

Comparative Example 5

An optical modulator (nonlinear-optical device) is prepared in the similar manner to Example 5, except that the core layer 3 is formed by using the stock solution E of Comparative Example 2 replacing the stock solution C of Example 5, and evaluated in the similar manner to Example 5.

As a result, an electro-optical effect that the intensity of output light is modulated according to the drive voltage applied is observed in a similar manner to Example 5. However, the half-wave voltage is very high at not less than 100 V, indicating that the optical modulator is significantly lower in electro-optical characteristics compared to the optical modulator of Example 5. In addition, when the optical modulation characteristics are evaluated once more after storage at 150° C. for one hour, most of the optical modulation characteristics have disappeared, indicating that the optical modulator is significantly lower in thermal stability of electro-optical characteristics, compared to the optical modulator of Example 5.

What is claimed is:

1. A stock solution for production of nonlinear-optical materials using a wet coating method, comprising a nonlinear-optically active organic compound satisfying either condition (i) or (ii):
   (i) the nonlinear-optically active organic compound further comprising at least one cross-linkable functional group comprising a hydrolysable silyl group; and the nonlinear-optically active organic compound is a push-pull π-conjugated compound represented by Formula (1), or
   (ii) the stock solution further comprises a matrix-forming compound having at least one cross-linkable functional group comprising a hydrolysable silyl group; and
   the nonlinear-optically active organic compound is represented by Formula (2):

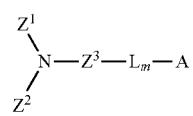

Formula (1)

wherein in Formula (1), $Z^1$ to $Z^3$ each are independently an aromatic group which may have substituents; L is a π-conjugated group which may have substituents; A is an electron-withdrawing group which may have substituents; and m is 0 or 1, wherein $Z^1$ to $Z^3$, L and A each may be linked with any other group to form a ring structure; and at least one of $Z^1$ to $Z^3$, L, and A has one or more cross-linkable functional groups:

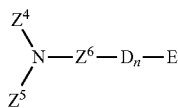

Formula (2)

wherein in Formula (2), $Z^4$ to $Z^6$ each are independently an aromatic group which may have substituents; D is a π-conjugated group which may have substituents; E is an electron-withdrawing group which may have substituents; n is 0 or 1; and $Z^4$ to $Z^6$, D, and E each may be linked with any other group to form a ring structure and may have one or more cross-linkable functional groups.

2. A stock solution according to claim 1, satisfying condition (i).

3. A stock solution according to claim 2, wherein A in Formula (1) represents a π-conjugated electron-withdrawing group, which contains a ring structure and may have substituents.

4. A stock solution according to claim 2, wherein a π-conjugation system that spans both ends of the $Z^3$-$L_m$ structure is present in Formula (1), and the π-conjugation system is formed from five or more consecutive unsaturated bonds.

5. A stock solution according to claim 1, wherein a solution containing the nonlinear-optically active organic compound is subjected at least to a hydrolysis treatment wherein the hydrolysable silyl group is brought into contact with a solid catalyst and hydrolyzed, and to a catalyst-separation treatment wherein the solid catalyst is removed from the solution after the hydrolysis treatment.

6. A stock solution according to claim 1, satisfying condition (ii).

7. A stock solution according to claim 6, wherein E in Formula (2) is a π-conjugated electron-withdrawing group, which has a ring structure and may have substituents.

8. A stock solution according to claim 6, wherein a π-conjugation system that spans both ends of the $Z^6$-$D_n$ structure is present in Formula (2), and the π-conjugation system is formed from five or more consecutive unsaturated bonds.

9. A stock solution according to claim 6, wherein a solution containing the nonlinear-optically active organic compound and the matrix-forming compound is subjected at least to a hydrolysis treatment wherein the hydrolysable silyl group is brought into contact with a solid catalyst and hydrolyzed, and to a catalyst-separation treatment wherein the solid catalyst is removed from the solution after the hydrolysis treatment.

10. A stock solution according to claim 6, wherein the matrix-forming compound comprises two or more hydrolysable silyl groups as the cross-linkable functional groups.

11. A nonlinear-optical material prepared using a wet coating method, wherein a stock solution for production of nonlinear-optical materials comprising a nonlinear-optically active organic compound is used, the stock solution satisfying the following condition (i) or (ii):

(i) the nonlinear-optically active organic compound further comprises at least one cross-linkable functional group comprising a hydrolysable silyl group; and the nonlinear-optically active organic compound is a push-pull π-conjugated compound represented by Formula (1), or (ii) the stock solution further comprises a matrix-forming compound having at least one cross-linkable functional group comprising a hydrolysable silyl group; and the nonlinear-optically active organic compound is represented by Formula (2):

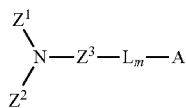

Formula (1)

wherein in Formula (1), $Z^1$ to $Z^3$ each are independently an aromatic group which may have substituents; L is a π-conjugated group which may have substituents; A is an electron-withdrawing group which may have substituents; m is 0 or 1; $Z^1$ to $Z^3$, L and A each may be linked with any other group to form a ring structure; and at least one group thereof has one or more cross-linkable functional groups:

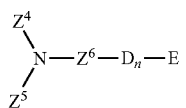

Formula (2)

wherein in Formula (2), $Z^4$ to $Z^6$ each are independently an aromatic group which may have substituents; D is a π-conjugated group which may have substituents; E is an electron-withdrawing group which may have substituents; n is 0 or 1; and $Z^4$ to $Z^6$, D, and E each may be linked with any other group to form a ring structure and may have one or more cross-linkable functional groups.

12. A material according to claim 11, prepared by using a stock solution satisfying condition (i).

13. A material according to claim 11, prepared by using a stock solution satisfying condition (ii).

14. A nonlinear-optical device prepared using a wet coating method wherein a stock solution for production of nonlinear-optical materials comprising a nonlinear-optically active organic compound is used, the stock solution satisfying the following condition (i) or (ii):

(i) the nonlinear-optically active organic compound further comprises at least one cross-linkable functional group comprising a hydrolysable silyl group; and the nonlinear-optically active organic compound is a push-pull π-conjugated compound represented by Formula (1), or (ii) the stock solution further comprises a matrix-forming compound having at least one cross-linkable functional group comprising a hydrolysable silyl group; and the nonlinear-optically active organic compound is represented by Formula (2):

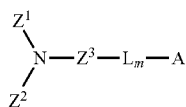

Formula (1)

wherein in Formula (1), $Z^1$ to $Z^3$ each are independently an aromatic group which may have substituents; L is a π-conjugated group which may have substituents; and A is an electron-withdrawing group which may have substituents; m is 0 or 1; wherein $Z^1$ to $Z^3$, L and A each may be linked with any other group to form a ring structure; and at least one group thereof has one or more cross-linkable functional groups:

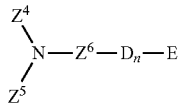

Formula (2)

wherein in Formula (2), $Z^4$ to $Z^6$ each are independently an aromatic group which may have substituents; D is a π-conjugated group which may have substituents; E is an electron-withdrawing group which may have substituents; n is 0 or 1; and $Z^4$ to $Z^6$, D, and E each may be linked with any other group to form a ring structure and may have one or more cross-linkable functional groups.

15. A device according to claim 14, prepared by using a stock solution satisfying condition (i).

16. A device according to claim 15, having a waveguide structure comprising one or more core layers which are sandwiched by cladding layers.

17. A device according to claim 14, prepared by using a stock solution satisfying condition (ii).

18. A device according to claim 17, having a waveguide structure comprising one or more core layers which are sandwiched by cladding layers.

* * * * *